US008059550B2

(12) United States Patent  (10) Patent No.: US 8,059,550 B2
Saito et al.  (45) Date of Patent: Nov. 15, 2011

(54) ELECTRONIC APPARATUS AND METHOD FOR DETECTING LOOP IN ELECTRONIC APPARATUS

(75) Inventors: Takehiko Saito, Kanagawa (JP); Masaki Kitano, Tokyo (JP); Hiroyuki Shigei, Tokyo (JP); Masaaki Takesue, Tokyo (JP)

(73) Assignee: Sony Corporation (JP)

( * ) Notice: Subject to any disclaimer, the term of this patent is extended or adjusted under 35 U.S.C. 154(b) by 74 days.

(21) Appl. No.: 12/449,553

(22) PCT Filed: Dec. 10, 2008

(86) PCT No.: PCT/JP2008/072378
§ 371 (c)(1),
(2), (4) Date: Aug. 12, 2009

(87) PCT Pub. No.: WO2009/078316
PCT Pub. Date: Jun. 25, 2009

(65) Prior Publication Data
US 2010/0238806 A1    Sep. 23, 2010

(30) Foreign Application Priority Data
Dec. 14, 2007   (JP) .............................. P2007-323467

(51) Int. Cl.
*H04J 1/16* (2006.01)
*H04L 12/28* (2006.01)
(52) U.S. Cl. ..................... 370/242; 370/248; 370/394
(58) Field of Classification Search .................. 370/242, 370/248, 394
See application file for complete search history.

(56) References Cited

U.S. PATENT DOCUMENTS
6,813,238 B1    11/2004   Otani et al.
7,394,499 B2    7/2008    Okamoto et al.
2002/0176370 A1 11/2002   Ohba et al.
2005/0063311 A1* 3/2005   Sekiguchi .................. 370/241
2005/0286430 A1* 12/2005  Koga et al. .................. 370/241
(Continued)

FOREIGN PATENT DOCUMENTS
EP    0930746 A1    7/1999
(Continued)

OTHER PUBLICATIONS
Office Action from Japanese Application No. 2007-323467, dated Jan. 25, 2011.
(Continued)

*Primary Examiner* — Andrew Lee
(74) *Attorney, Agent, or Firm* — Lerner, David, Littenberg, Krumholz & Mentlik, LLP

(57) ABSTRACT

To provide an electronic apparatus capable of easily detecting a terminal that forms a loop connection state with a simplified configuration.
A control unit counts the number of broadcast packet supplied from a switching hub to a communication unit within a predetermined time period and determines whether the number of packets exceeds a threshold value (ST2, ST3). If the number of packets exceeds the threshold value, the control unit determines that an abnormal connection state occurs, that is, a loop is detected and starts a process in which the control unit identifies a network terminal that forms the loop connection state (ST3, ST5). The control unit counts the number of broadcast packets that reach each of the network terminals, that is, broadcast packets input to each port of the switching hub. Thereafter, the control unit determines whether the network terminal that has received the number of packets exceeding the threshold value is present, that is, whether an abnormally connected terminal is present (ST5, ST6). If an abnormally connected terminal is present, the control unit displays a message indicating abnormal connection, the abnormally connected terminal, and a message prompting connection change (ST7).

11 Claims, 16 Drawing Sheets

U.S. PATENT DOCUMENTS

| | | |
|---|---|---|
| 2006/0013143 A1* | 1/2006 | Yasuie et al. .................. 370/249 |
| 2006/0126517 A1 | 6/2006 | Kurosaki et al. |
| 2007/0014232 A1* | 1/2007 | Yasuie et al. .................. 370/216 |
| 2007/0127385 A1* | 6/2007 | Yasuie et al. .................. 370/242 |
| 2007/0230360 A1* | 10/2007 | Nishi et al. .................... 370/249 |
| 2007/0280238 A1 | 12/2007 | Lund |
| 2009/0028180 A1* | 1/2009 | Strater et al. .................. 370/465 |

FOREIGN PATENT DOCUMENTS

| | | |
|---|---|---|
| JP | 10-243009 A | 9/1998 |
| JP | 2000183943 A | 6/2000 |
| JP | 2004304709 A | 10/2004 |
| JP | 2005-086762 A | 3/2005 |
| JP | 2006-013737 A | 1/2006 |
| JP | 2007036824 A | 2/2007 |
| JP | 2007-053421 A | 3/2007 |
| WO | WO-02/078336 A1 | 10/2002 |

OTHER PUBLICATIONS

Supplementary European Search Report EP 08862524, dated Jun. 17, 2011.

* cited by examiner

FIG. 7

| PIN | Signal Assignment |
|---|---|
| 1 | TMDS Data2+ |
| 3 | TMDS Data2− |
| 5 | TMDS Data1 Shield |
| 7 | TMDS Data0+ |
| 9 | TMDS Data0− |
| 11 | TMDS Clock Shield |
| 13 | CEC |
| 15 | SCL |
| 17 | DDC/CEC Ground |
| 19 | Hot Plug Detect |

| PIN | Signal Assignment |
|---|---|
| 2 | TMDS Data2 Shield |
| 4 | TMDS Data1+ |
| 6 | TMDS Data1− |
| 8 | TMDS Data0 Shield |
| 10 | TMDS Clock+ |
| 12 | TMDS Clock− |
| 14 | Reserved (N.C. on device) |
| 16 | SDA |
| 18 | +5V Power | ns
ELECTRONIC APPARATUS AND METHOD FOR DETECTING LOOP IN ELECTRONIC APPARATUS

CROSS-REFERENCES TO RELATED APPLICATIONS

The present application is a national phase entry under 35 U.S.C. §371 of International Application No. PCT/JP2008/072378 filed Dec. 10, 2008, published on Jun. 25, 2009 as WO 2009/078316 A1, which claims priority from Japanese Patent Application No. JP 2007-323467 filed in the Japanese Patent Office on Dec. 14, 2007.

TECHNICAL FIELD

The present invention relates to an electronic apparatus and a method for detecting a loop in an electronic apparatus. More particularly, the present invention relates to an electronic apparatus capable of easily detecting an abnormally connected terminal with a simplified configuration by counting the number of broadcast packets reaching a plurality of terminals to which transmission lines that transmit data packets are connected within a predetermined time period and comparing each count number with a threshold value so as to determine the terminals having loop connection, that is, the abnormally connected terminals.

BACKGROUND ART

In recent years, HDMI (High Definition Multimedia Interface) has been in widespread use as a communication interface that transmits a digital video signal, that is, an uncompressed (baseband) video signal (hereinafter referred to as "image data") and a digital audio signal (hereinafter referred to as "audio data") associated with the video signal from, for example, a DVD (Digital Versatile Disc) recorder, a set-top box, or another AV source (Audio Visual source) to a television receiver, a projector, or another display at high speed. For example, Patent Document 1 describes the HDMI specification in detail.

In addition, in recent years, in addition to widely used personal computers, even general consumer products have been frequently connected to the Internet. For terrestrial digital broadcasting and BS digital broadcasting, Ethernet is defined as means for providing EPG information. In general, television sets and apparatuses that support digital broadcasting have a RJ-45 connector mounted thereon.

Furthermore, as video recording means, video recording apparatuses that record video received via Ethernet are provided. Still furthermore, in the near feature, video distribution via the Internet, such as IP-TV, is planed to be provided. Therefore, in the near feature, apparatuses each having a plurality of Ethernet connectors may be commercially available. In such a case, loop connection may occur depending on how the terminals are connected.

For example, Patent Document 2 describes loop monitoring and detecting means that counts received MAC frames having the same FCS (Frame Check Sequence) value and determines that a network is in a loop mode if the number of received MAC frames having the same FCS value within a predetermined time period is a predetermined threshold value or greater.

Patent Document 1: Publication No. WO2002/078336
Patent Document 2: Japanese Unexamined Patent Application Publication No. 2006-13737

DISCLOSURE OF INVENTION

Problems to be Solved by the Invention

As described above, in technology in which the number of MAC frames having the same FCS value received during a certain time period is used, information in FCS fields of the MAC frames needs to be written to a search engine unit and, therefore, large memory capacity is required. In addition, a process determining whether the same FCS value is used is required. Accordingly, the configuration is complicated, and the processing load imposed on a CPU is significantly increased.

It is an object of the present invention to easily determine terminals that are in a loop connection state (abnormally connected terminals) using a simplified configuration.

Means for Solving the Problems

The concept of the present invention is characterized by an electronic apparatus including a plurality of terminals to which transmission paths that transmit data packets are connected, a switching hub to which the plurality of terminals are connected, a communication unit for transmitting and receiving the data packets via the switching hub, a packet counting unit for counting the number of broadcast packets reaching the plurality of terminals within a predetermined time period, and a loop detection unit for detecting the terminal that forms a loop connection state by comparing a count value for each of the plurality of terminals counted by the packet counting unit with a threshold value.

According to the present invention, the switching hub is disposed between the communication unit and the plurality of terminals. The communication unit transmits a data packet to the transmission paths via the switching hub. In addition, the communication unit receives a data packet from the transmission paths. For example, some of the transmission paths may be bidirectional transmission paths formed from predetermined lines (e.g., a reserve line and an HPD line) of an HDMI cable. The packet counting unit counts the number of broadcast packets reaching the plurality of terminals within a predetermined time period. For example, this measurement is performed when power is turned on, is performed at predetermined intervals, is performed when a user disconnects an HDMI cable and, subsequently, connects the HDMI cable, or is performed in response to a user instruction.

For example, the packet counting unit performs the counting operation when, for example, the number of broadcast packets transmitted from the switching hub to the communication unit within a predetermined time period exceeds a threshold value. In this case, the packet counting unit needs not count the number of broadcast packets reaching the plurality of terminals within a predetermined time period within a predetermined time period from the beginning. Accordingly, the processing load can be reduced.

As noted above, by counting the number of broadcast packets reaching the plurality of terminals to which transmission paths that transmits data packets are connected within a predetermined time period and comparing each of the count values with a threshold value so as to detect the terminal that forms a loop connection state, that is, the abnormally connected terminal, the abnormally connected terminal can be easily detected with a simplified structure.

According to the present invention, for example, the electronic apparatus can further include an information display unit for displaying a message indicating the occurrence of abnormal connection and the terminal that forms the loop connection state on the basis of the determination result of the loop detection unit. In this case, a user can identify the abnormally connected terminal or the terminal that forms a loop connection state and disconnect the abnormally connected terminal. Accordingly, the loop connection state can be easily avoided.

In addition, according to the present invention, for example, the information display unit can further display a message prompting a connection change. In this case, the information display unit can prompt the user to disconnect the abnormally connected terminal so that the loop connection state can be avoided.

Furthermore, according to the present invention, for example, the electronic apparatus can further include a communication blocking control unit for blocking communication performed through the terminal that forms the loop connection state. In this case, for example, a troublesome operation in which the user disconnects the cable from the incorrectly connected terminal can be eliminated.

Still furthermore, according to the present invention, for example, when the packet counting unit counts the number of the broadcast packets transmitted within the predetermined time period, the communication blocking control unit can cancel blocking of communication previously activated. By canceling blocking of communication previously activated in this way, a connection state different from the previous connection state appears due to cable disconnection or a connection change. Accordingly, if the terminal for which communication is previously blocked does not currently form a loop connection, communication through the terminal can be automatically resumed on the basis of the detection result of the loop detection unit.

Yet still furthermore, according to the present invention, the electronic apparatus can further include a user selection unit for allowing a user to select whether communication through the terminal that forms a loop transmission path is blocked. If the user selects, through the user selection unit, blocking of the communication, the communication blocking control unit can block the communication through the terminal that forms a loop transmission path. In this case, blocking of communication that the user does not desire can be automatically prevented.

Yet still furthermore, according to the present invention, for example, when the packet counting unit counts the number of broadcast packets transmitted within the predetermined time period, the communication unit can transmit the broadband packet to the transmission paths to which the plurality of terminals are connected via the switching hub. In this case, since a broadcast packet is transmitted from the communication unit to the transmission paths, determination whether the terminal forms a loop connection state on the basis of the number of reaching broadcast packets can be reliably made.

Yet still furthermore, according to the present invention, the switching hub can transmit, to the communication unit via a cable, at least the broadcast packet among data packets to be transmitted to the communication unit. In this case, the sensitivity of determination whether the number of the broadcast packets transmitted from the switching hub to the communication unit within the predetermined time period exceeds the threshold value, that is, the sensitivity of loop detection can be increased.

Yet still furthermore, according to the present invention, the switching hub can limit a transmission bandwidth for the communication unit to a predetermined bandwidth. In this way, even when a loop connection state occurs, supply of broadcast packets to the communication unit can be limited. Accordingly, the processing load of the communication unit can be reduced.

Advantages

According to the present invention, the number of broadcast packet reaching a plurality of terminals to which transmission paths that transmit data packets are connected within a predetermined time period is counted. Thereafter, each of the count numbers is compared with a threshold value so that a terminal that forms a loop connection state is determined. Thus, a terminal that forms a loop connection state can be easily determined.

BRIEF DESCRIPTION OF DRAWINGS

FIG. 7 illustrates the pin assignment (type A) of an HDMI terminal.

EXPLANATION OF REFERENCE NUMERALS

100 AV system, 110 broadband router, 130 television receiver, 131a-131e network terminal, 132a-132f port, 133 switching hub, 134a, 134b high-speed data line interface, 135 communication unit (Ethernet interface), 136 control unit, 137 user operation unit, 138 display panel, 150 set-top box, 160 personal computer, 170 amplifier, 180 BD recorder, 211-213 HDMI cable, 221-224 Ethernet cable, 231 reception-side FIFO memory, 232 packet input unit, 233 transmission-side FIFO memory for broadcast packet, 234 transmission-side FIFO memory for non-broadcast packet, 235 packet output unit, 236 bandwidth limiting unit

BEST MODE FOR CARRYING OUT THE INVENTION

Figure 1:
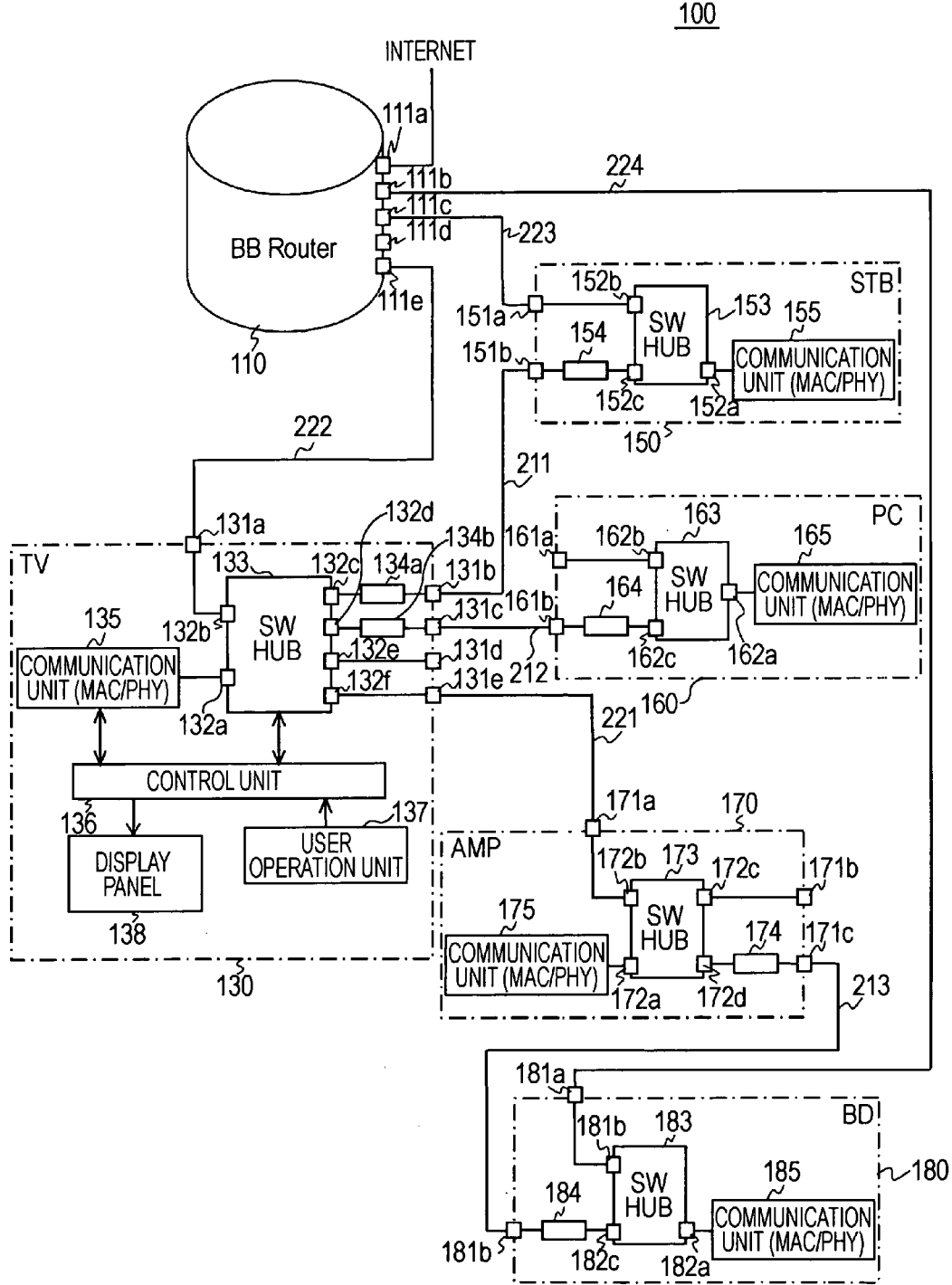
FIG. 1 is a block diagram of an exemplary configuration of an AV system according to an embodiment of the present invention.

An embodiment of the present invention is described below with reference to the accompanying drawings. FIG. 1 illustrates an exemplary configuration of an AV system 100 according to an embodiment.

The AV system 100 has a configuration in which a set-top box (STB) 150 and a personal computer (PC) 160 are connected to a television receiver 130, and a BD (Blu-ray Disc) recorder 180 is connected to the television receiver 130 via an amplifier 170. In addition, the television receiver 130, the set-top box 150, and the Blu-ray Disc recorder 180 are connected to a broadband router (BB router) 110.

The configuration of the AV system 100 is further described next. The broadband router 110 includes a plurality of ports. In the present embodiment, the broadband router 110 includes an Ethernet port 111a on the WAN (Wide Area Network) side and four Ethernet ports 111b to 111e on the LAN (Local Area Network) side. Note that "Ethernet" is a registered trade mark.

The television receiver 130 serving as a sink device includes five network terminals 131a to 131e, a switching hub 133 including six ports 132a to 132f, high-speed data line interfaces 134a and 134b, a communication unit 135 including a MAC layer processing unit and a PHY layer processing unit, a control unit 136, a user operation unit 137, and a display panel 138.

The control unit 136 controls a variety of units of the television receiver 130. The user operation unit 137 forms a user interface. The user operation unit 137 is connected to the control unit 136. The control unit 136 includes keys, buttons, and dials disposed on a casing (not shown) of the television receiver 130 or a remote control. The display panel 138 forms a user interface (UI). For example, the display panel 138 displays a UI screen on the basis of a display signal generated by the control unit 136. For example, the display panel 138 is composed of an LCD (Liquid Crystal Display), an organic EL (Electro Luminescence), or a PDP (Plasma Display Panel).

Each of the network terminals 131a, 131d, and 131e is formed from an Ethernet port. The network terminals 131a, 131d, and 131e are connected to the ports 132b, 132e, and 132f of the switching hub 133, respectively.

In addition, each of the network terminals 131b and 131c is formed from an HDMI terminal. An HDMI receiving unit and a high-speed data line interface are connected to this HDMI terminal. The network terminals 131b and 131c are connected to the ports 132c and 132d of the switching hub 133 via the high-speed data line interfaces 134a and 134b, respectively. In FIG. 1, an HDMI receiving unit is not shown.

The HDMI receiving unit receives, using HDMI-based communication, baseband video and audio data unidirectionally transmitted from a source device that is connected to the HDMI receiving unit via an HDMI cable. The high-speed data line interface is a bidirectional interface formed from predetermined lines of an HDMI cable (a reserved line and an HPD line in the present embodiment). This high-speed data line interface forms a communication unit that performs bidirectional communication with an external device (a source device). The HDMI receiving unit and the high-speed data line interface are described in more detail below.

Figure 2:
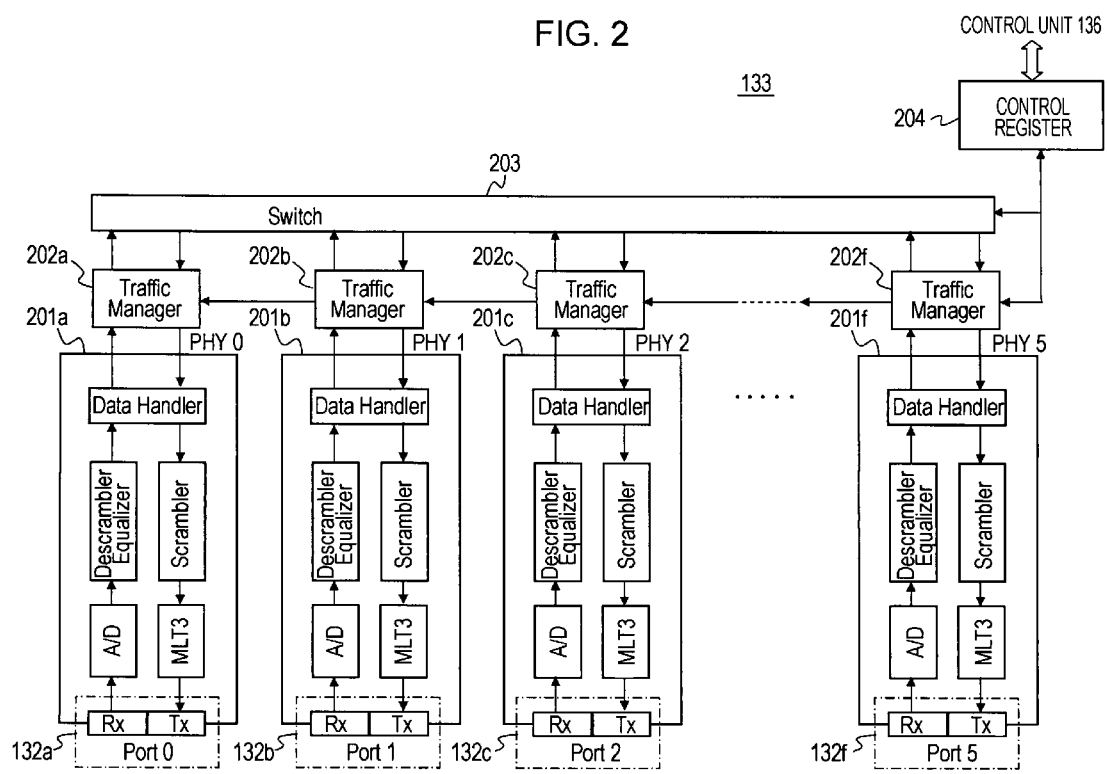
FIG. 2 is a block diagram of an exemplary configuration of a switching hub included in a television receiver.

The switching hub 133 analyzes a destination address of a data packet input to each of the ports and outputs the data packet from a port corresponding to the destination address. FIG. 2 illustrates an exemplary configuration of the switching hub 133.

The switching hub 133 includes six ports 132a to 132f (Port 0 to Port 5), PHY layer processing units 201a to 201f, traffic managers 202a to 202f, a switching unit 203, and a control register 204. Each of the PHY layer processing units includes an A/D converter, a descrambler-equalizer, a data handler, a scrambler, and an MLT3 converter.

The A/D converter A/D-converts a signal input to a reception-side terminal Rx. The descrambler-equalizer performs a waveform equalizing process and a descrambling process on a signal output from the A/D converter. The data handler supplies a signal output from the descrambler-equalizer to the traffic manager and supplies a signal received from the traffic manager to the scrambler. The scrambler performs a scrambling process on the signal received from the traffic manager. The MLT3 converter performs a MLT3 modulation process on a signal output from the scrambler and outputs the modulated signal to a transmission-side terminal Tx.

The traffic managers 202a to 202f are connected to the switching unit 203. Each of the traffic managers 202a to 202f temporarily stores, in a reception-side FIFO memory, packet data transmitted from the PHY layer processing unit of a corresponding one of the ports. In addition, each of the traffic managers 202a to 202f temporarily stores packet data transmitted from the switching unit 203 in a transmission-side FIFO memory. Thereafter, each of the traffic managers 202a to 202f transmits the packet data to the PHY layer processing unit of the corresponding one of the ports.

The switching unit 203 sequentially reads the packet data items stored in the reception-side FIFO memory of the traffic managers 202a to 202f, analyzes the destination address of the packet data item, and outputs the packet data item to the traffic manager of the port corresponding to the destination address. In this case, if the data packet read from the FIFO memory of the traffic manager of one of the ports is a broadcast packet, the broadcast packet is sent from the switching unit 203 to the traffic managers of all of the other ports.

Figure 3:
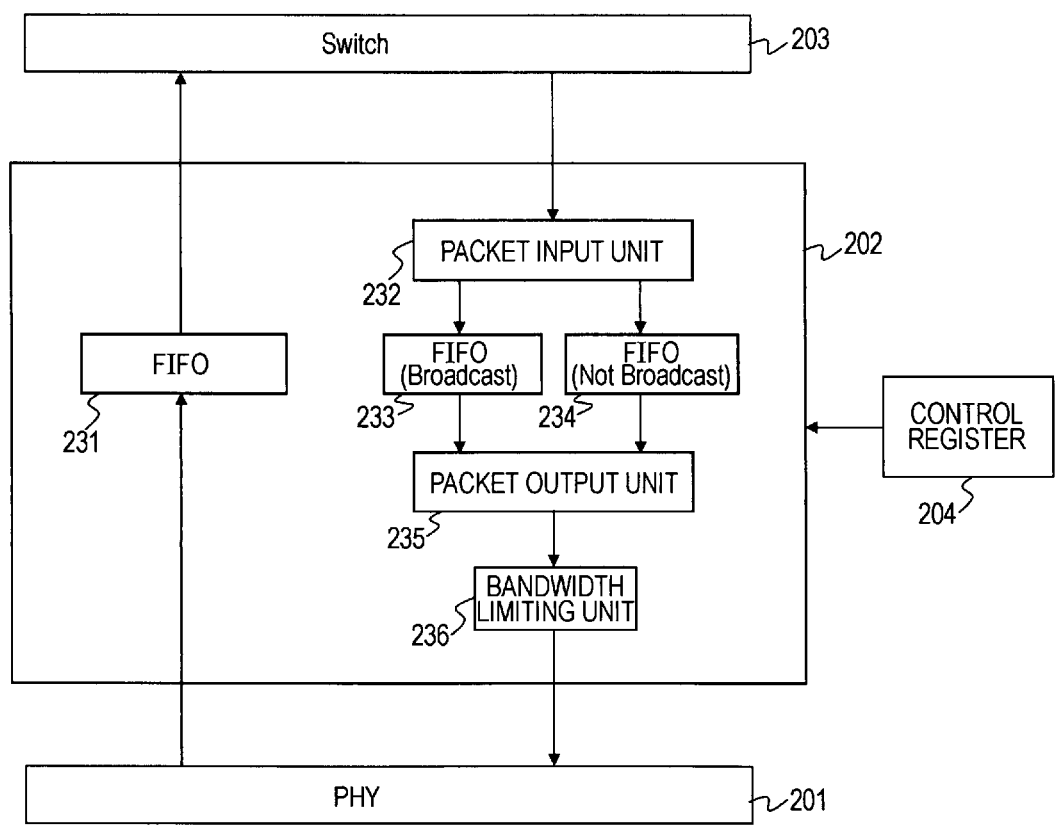
FIG. 3 is a block diagram of an exemplary configuration of a traffic manager forming the switching hub.

FIG. 3 illustrates a particular configuration of a traffic manager 202 (one of the traffic managers 202a to 202f).

The traffic manager 202 includes a reception-side FIFO memory 231, a packet input unit 232, a transmission-side FIFO memory 233 for a broadcast packet, a transmission-side FIFO memory 234 for a non-broadcast packet, a packet output unit 235, and a bandwidth limiting unit 236.

The reception-side FIFO memory 231 temporarily stores a data packet transmitted from a PHY layer processing unit 201 (one of the PHY layer processing units 201a to 201f). The packet input unit 232 determines whether a data packet transmitted from the switching unit 203 is a broadcast packet or a non-broadcast packet. Thereafter, the packet input unit 232 writes a broadcast packet to the FIFO memory 233 and writes a non-broadcast packet to the FIFO memory 234.

The packet output unit 235 sequentially reads the data packet from the FIFO memory 233 and the FIFO memory 234. Thereafter, the packet output unit 235 transmits the readout data packet to the PHY layer processing unit 201 via the bandwidth limiting unit 236. The bandwidth limiting unit 236 limits the transmission band.

The operation performed by the traffic manager 202 is controlled by the control unit 136 (see FIGS. 1 and 2) via the control register 204. According to the present embodiment, the traffic manager 202a corresponding to the port 132a (Port 0) is controlled as follows.

That is, when the control unit 136 performs loop detection processing described below, the packet output unit 235 preferentially reads the broadcast packet stored in the FIFO memory 233 and outputs the broadcast packet. That is, as long as a broadcast packet is present in the FIFO memory 233, the packet output unit 235 reads the broadcast packet from the FIFO memory 233 and outputs the broadcast packet. Only when a broadcast packet is not present in the FIFO memory 233, the packet output unit 235 reads the non-broadcast packet (a unicast packet or a multicast packet) from the FIFO memory 234 and outputs the non-broadcast packet. In this way, by preferentially outputting a broadcast packet from the packet output unit 235, the sensitivity of detection of a loop connection state (loop detection) can be increased.

In addition, when the control unit 136 performs loop detection processing described below, the bandwidth limiting unit 236 limits the transmission bandwidth to a predetermined transmission bandwidth. For example, when a normal transmission bandwidth is 100 Mbps, the transmission bandwidth is limited to 1 Mbps during the loop detection processing. In this way, by limiting a transmission bandwidth to a constant transmission bandwidth using the bandwidth limiting unit 236, the number of broadcast packets transmitted to the communication unit 135 can be limited. Accordingly, unsuccessful loop detection processing caused by the overload of the control unit (the CPU) 136 can be prevented.

Like the above-described traffic manager 202a corresponding to the port 132a (Port 0), when each of the traffic managers 202b to 202f corresponding to the ports 132b to 132f (Ports 1 to 5), respectively, performs loop detection processing described below, the packet output unit 235 may preferentially reads the broadcast packet stored in the FIFO memory 233 and outputs the broadcast packet. In this way, when a loop connection state occurs and if the packet output unit 235 preferentially outputs a broadcast packet, the broadcast packet preferentially flows in the loop. Accordingly, the sensitivity of loop detection and the sensitivity of detection of network terminals that cause the loop connection state can be increased.

Referring back to FIG. 1, the communication unit 135 of the television receiver 130 is connected to the port 132a of the switching hub 133. The communication unit 135 transmits and receives a data packet via the switching hub 133. The communication unit 135 forms an Ethernet interface.

Note that, for the television receiver 130 shown in FIG. 1, only a portion associated with Ethernet communication is schematically shown. This representation is also applied to the set-top box 150, the personal computer 160, the amplifier 170, and the Blu-ray Disc recorder 180 shown in FIG. 1.

The set-top box 150 serving as a source device includes two network terminals 151a and 151b, a switching hub 153 having three ports 152a to 152c, a high-speed data line interface 154, and a communication unit 155 including a MAC layer processing unit and a PHY layer processing unit.

The network terminal 151a is formed from an Ethernet port. The network terminal 151a is connected to the port 152b of the switching hub 153. The network terminal 151b is formed from an HDMI terminal. An HDMI transmitting unit and a high-speed data line interface are connected to the HDMI terminal. The network terminal 151b is connected to the port 152c of the switching hub 153 via the high-speed data line interface 154.

The HDMI transmitting unit unidirectionally transmits, using HDMI-based communication, baseband video and audio data to a sink device connected thereto via an HDMI cable. The high-speed data line interface is a bidirectional interface formed from predetermined lines of an HDMI cable (a reserved line and an HPD line in the present embodiment). This high-speed data line interface forms a communication unit that allows bidirectional communication with an external device (a sink device). The HDMI transmitting unit and the high-speed data line interface are described in more detail below.

The communication unit 155 is connected to the port 152a of the switching hub 153. The communication unit 155 transmits and receives a data packet via the switching hub 153. The communication unit 155 forms an Ethernet interface.

The personal computer 160 serving as a source device includes two network terminals 161a and 161b, a switching hub 163 having three ports 162a to 162c, a high-speed data line interface 164, and a communication unit 165 including a MAC layer processing unit and a PHY layer processing unit.

The network terminal 161a is formed from an Ethernet port. The network terminal 161a is connected to the port 162b of the switching hub 163. The network terminal 161b is formed from an HDMI terminal. An HDMI transmitting unit and a high-speed data line interface are connected to the HDMI terminal. The network terminal 161b is connected to the port 162c of the switching hub 163 via the high-speed data line interface 164.

The HDMI transmitting unit unidirectionally transmits, using HDMI-based communication, baseband video and audio data to a sink device connected thereto via an HDMI cable. The high-speed data line interface is a bidirectional interface formed from predetermined lines of an HDMI cable (a reserved line and an HPD line in the present embodiment). This high-speed data line interface forms a communication unit that performs bidirectional communication with an external device (a sink device). The HDMI transmitting unit and the high-speed data line interface are described in more detail below.

The communication unit 165 is connected to the port 162a of the switching hub 163. The communication unit 165 transmits and receives a data packet via the switching hub 163. The communication unit 165 forms an Ethernet interface.

The amplifier 170 serving as a repeater device includes three network terminals 171a to 171c, a switching hub 173 having four ports 172a to 172d, a high-speed data line interface 174, and a communication unit 175 including a MAC layer processing unit and a PHY layer processing unit.

Each of the network terminals 171a and 171b is formed from an Ethernet port. The network terminals 171a and 171b are connected to the ports 172b and 172c of the switching hub 173, respectively. The network terminal 171c is formed from an HDMI terminal. An HDMI transmitting unit and a high-speed data line interface are connected to the HDMI terminal. The network terminal 171c is connected to the port 172d of the switching hub 173 via the high-speed data line interface 174.

The HDMI transmitting unit unidirectionally transmits, using HDMI-based communication, baseband video and audio data to a sink device connected thereto via an HDMI cable. The high-speed data line interface is a bidirectional interface including predetermined lines of an HDMI cable (a reserved line and an HPD line in the present embodiment). This high-speed data line interface forms a communication unit that allows bidirectional communication with an external device (a sink device). The HDMI transmitting unit and the high-speed data line interface are described in more detail below.

The communication unit 175 is connected to the port 172a of the switching hub 173. The communication unit 175 transmits and receives a data packet via the switching hub 173. The communication unit 175 forms an Ethernet interface.

The BD recorder 180 serving as a source device includes two network terminals 181a and 181b, a switching hub 183 having three ports 182a to 182c, a high-speed data line interface 184, and a communication unit 185 including a MAC layer processing unit and a PHY layer processing unit.

The network terminal 181a is formed from an Ethernet port. The network terminal 181a is connected to the port 182b of the switching hub 183. The network terminal 181b is formed from an HDMI terminal. An HDMI transmitting unit and a high-speed data line interface are connected to an HDMI terminal. The network terminal 181b is connected to the port 182c of the switching hub 183 via the high-speed data line interface 184.

The HDMI transmitting unit unidirectionally transmits, using HDMI-based communication, baseband video and audio data to a sink device connected thereto via an HDMI cable. The high-speed data line interface is a bidirectional interface including predetermined lines of an HDMI cable (a reserved line and an HPD line in the present embodiment). This high-speed data line interface forms a communication unit that allows bidirectional communication with an external device (a sink device). The HDMI transmitting unit and the high-speed data line interface are described in more detail below.

The communication unit 185 is connected to the port 182a of the switching hub 183. The communication unit 185 transmits and receives a data packet via the switching hub 183. The communication unit 185 forms an Ethernet interface.

As described above, in the AV system 100 shown in FIG. 1, the set-top box (STB) 150 and the personal computer (PC) 160 are connected to the television receiver 130. In addition, the BD (Blu-ray Disc) recorder 180 is connected to the television receiver 130 via the amplifier 170.

That is, the network terminal 131b of the television receiver 130 is connected to the network terminal 151b of the set-top box 150 via an HDMI cable 211. In addition, the network terminal 131c of the television receiver 130 is connected to the network terminal 161b of the personal computer 160 via an HDMI cable 212. Furthermore, the network terminal 131e of the television receiver 130 is connected to the network terminal 171a of the amplifier 170 via an Ethernet cable 221. The network terminal 171c of the amplifier 170 is connected to the network terminal 181b of the BD recorder 180 via an HDMI cable 213.

In addition, as mentioned earlier, in the AV system 100 shown in FIG. 1, the television receiver 130, the set-top box 150, and the BD recorder 180 are connected to the broadband router (BB router) 110.

That is, the network terminal 131a of the television receiver 130 is connected to the port 111e of the broadband router 110 via an Ethernet cable 222. In addition, the network terminal 151a of the set-top box 150 is connected to the port 111c of the broadband router 110 via an Ethernet cable 223. Furthermore, the network terminal 181a of the BD recorder 180 is connected to the port 111b of the broadband router 110 via an Ethernet cable 224.

In the AV system 100 shown in FIG. 1, the television receiver 130 serving as a sink device can communicate with the set-top box 150 serving as a source device via the HDMI cable 211. In addition, the television receiver 130 serving as a sink device can communicate with the personal computer 160 serving as a source device via the HDMI cable 212. Furthermore, the television receiver 130 serving as a sink device can communicate with the BD recorder 180 serving as a source device via the Ethernet cable 221, the amplifier 170, and the HDMI cable 213.

In addition, since the television receiver 130 is connected to the broadband router 110 via the Ethernet cable 222, the television receiver 130 can be connected to the Internet. Accordingly, for example, a user can browse a desired Web page. Furthermore, since the set-top box 150 is connected to the broadband router 110 via the Ethernet cable 223, the set-top box 150 can be connected to the Internet. Accordingly, for example, the set-top box 150 can play desired streaming content or download the content. Still furthermore, since the BD recorder 180 is connected to the broadband router 110 via the Ethernet cable 224, the BD recorder 180 can be connected to the Internet. Accordingly, for example, the BD recorder 180 can play desired streaming content or download the content.

Figure 4:
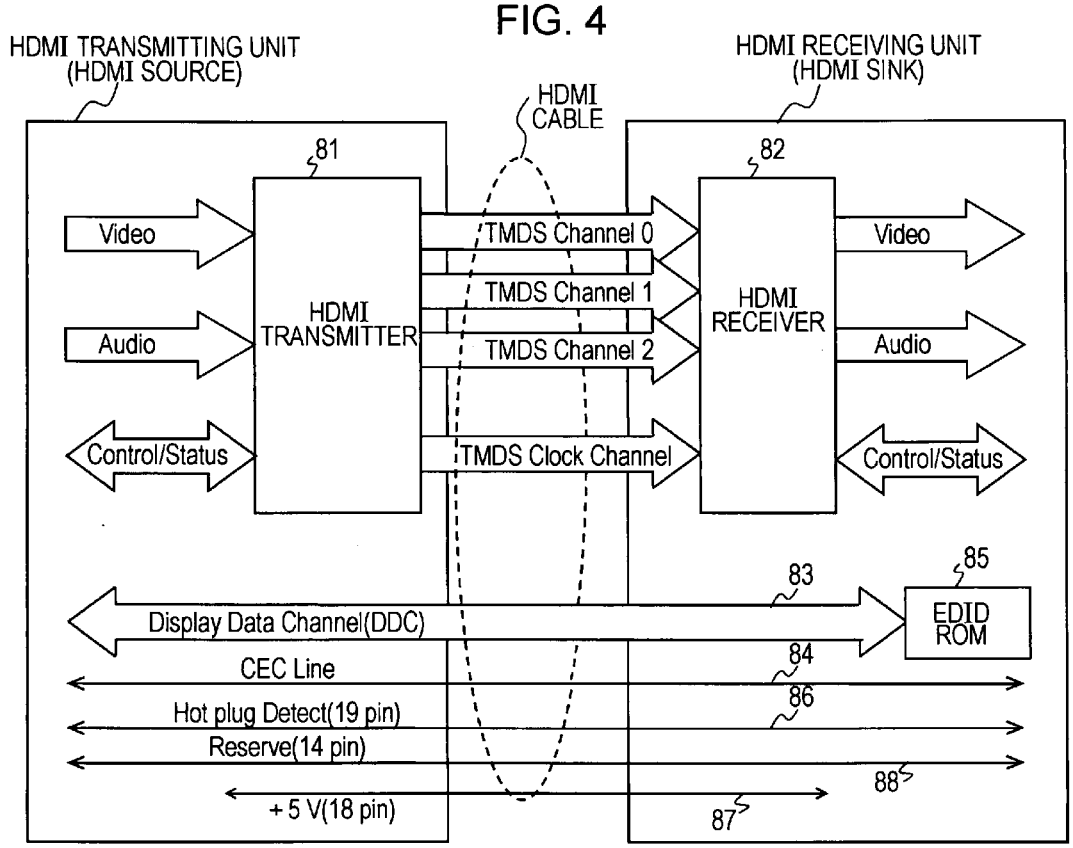
FIG. 4 is a block diagram of exemplary configurations of an HDMI transmitting unit of a source device and an HDMI receiving unit of a sink device.

FIG. 4 illustrates exemplary configurations of the HDMI transmitting unit (the HDMI source) of the source device (the set-top box 150, the personal computer 160, or the BD recorder 180) and the HDMI receiving unit (the HDMI sink) of the sink device (the television receiver 130).

During an effective image period (hereinafter also referred to as an "active video period"), which is a period from a vertical synchronization signal to the next vertical synchronization signal excluding a horizontal flyback period and a vertical flyback period, the HDMI transmitting unit unidirectionally transmits a differential signal corresponding to pixel data of an uncompressed image for one screen to the HDMI receiving unit using a plurality of channels. In addition, during a horizontal flyback period and a vertical flyback period, the HDMI transmitting unit unidirectionally transmits at least audio data and control data associated with the image to the HDMI receiving unit using a plurality of channels.

That is, the HDMI transmitting unit includes a transmitter 81. For example, the transmitter 81 converts pixel data of an uncompressed image into a corresponding differential signal and unidirectionally and serially transmits, using three TMDS channels #0, #1, and #2, the differential signal to the HDMI receiving unit connected thereto via an HDMI cable.

In addition, the transmitter 81 converts audio data associated with the uncompressed image, necessary control data, and auxiliary data into corresponding differential signals and unidirectionally and serially transmits, using three TMDS channels #0, #1, and #2, the differential signals to the HDMI receiving unit connected thereto via the HDMI cable.

Furthermore, the transmitter 81 transmits, using a TMDS clock channel, a pixel clock in synchronization with the pixel data transmitted using the three TMDS channels #0, #1, and #2 to the HDMI receiving unit connected thereto via the HDMI cable. Here, through one TMDS channel #i (i=0, 1, 2), 10-bit pixel data is transmitted during one pixel clock.

The HDMI receiving unit receives the differential signal corresponding to pixel data unidirectionally transmitted from the HDMI transmitting unit using a plurality of channels during an active video period. In addition, the HDMI receiving unit receives differential signals corresponding to the audio data and control data unidirectionally transmitted from the HDMI transmitting unit using the plurality of channels during a horizontal flyback period and a vertical flyback period.

That is, the HDMI receiving unit includes a receiver 82. For example, the receiver 82 receives, using the TMDS channels #0, #1, and #2, the differential signal corresponding to pixel data and the differential signals corresponding to the audio data and control data unidirectionally transmitted from the HDMI transmitting unit connected thereto via an HDMI cable in synchronization with the pixel clock transmitted from the HDMI transmitting unit using the TMDS clock channel.

Examples of transmission channels of the HDMI system formed from the HDMI transmitting unit and the HDMI receiving unit include the three TMDS channels #0 to #2 that unidirectionally and serially transmit pixel data and audio data from the HDMI transmitting unit to the HDMI receiving unit in synchronization with the pixel clock, the TMDS clock channel serving as a transmission channel that transmits the pixel clock, a DDC (Display Data Channel) 83, and a transmission channel called a CEC line 84.

The DDC 83 is formed from two signal lines (not shown) contained in an HDMI cable. The DDC 83 is used by an HDMI transmitting unit when the HDMI transmitting unit reads E-EDID (Enhanced Extended Display Identification Data) from an HDMI receiving unit connected thereto via the HDMI cable.

That is, in addition to the HDMI receiver 82, the HDMI receiving unit includes an EDID ROM (Read Only Memory) 85 that stores the E-EDID which is information regarding the performance (configuration/capability) of the HDMI receiving unit. The HDMI transmitting unit reads, from an HDMI receiving unit connected thereto via an HDMI cable, the E-EDID regarding the HDMI receiving unit via the DDC 83. Thereafter, for example, the HDMI transmitting unit recognizes the format (the profile) of an image supported by an electronic apparatus including the HDMI receiving unit (e.g., RGB, YCbCr 4:4:4, or YCbCr 4:2:2).

The CEC line 84 is formed from a signal line (not shown) contained in an HDMI cable. The CEC line 84 is used for bidirectional communication of control data between the HDMI transmitting unit and the HDMI receiving unit.

In addition, the HDMI cable contains a line 86 connected to a pin called HPD (Hot Plug Detect). A source device can detect, using the line 86, that a sink device is connected thereto. Furthermore, the HDMI cable contains a line 87, which is used for supplying power from a source device to a sink device. Still furthermore, the HDMI cable contains a reserve line 88.

Figure 5:
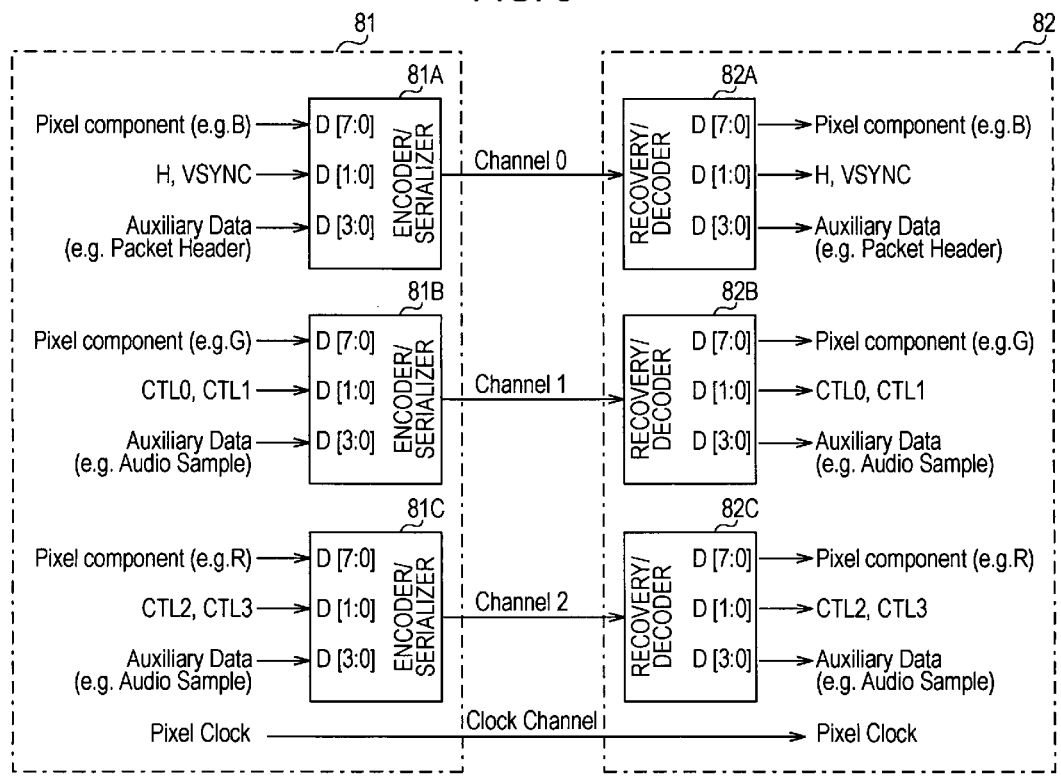
FIG. 5 illustrates exemplary configurations of an HDMI transmitter and an HDMI receiver.

FIG. 5 illustrates exemplary configurations of the HDMI transmitter 81 and the HDMI receiver 82 shown in FIG. 4.

The transmitter 81 includes three encoder/serializers 81A, 81B, and 81C corresponding to the three TMDS channels #0, #1, and #2, respectively. In addition, each of the encoder/serializers 81A, 81B, and 81C encodes supplied image data, additional data, and control data, converts from parallel data to serial data, and transmits the data in the form of differential signals. Here, if the image data contains three components R (red), G (green), and B (blue), the B component is supplied to the encoder/serializer 81A. The G component is supplied to the encoder/serializer 81B. The R component is supplied to the encoder/serializer 81C.

Note that examples of the auxiliary data include audio data and a control packet. For example, the control packet is supplied to the encoder/serializer 81A, and the audio data is supplied to the encoder/serializers 81B and 81C.

In addition, examples of the control data include a one-bit vertical synchronization signal (VSYNC), a one-bit horizontal synchronization signal (HSYNC), and one-bit control bits CTL0, CTL1, CTL2, and CTL3. The vertical synchronization signal and the horizontal synchronization signal are supplied to the encoder/serializer 81A. The control bits CTL0 and CTL1 are supplied to the encoder/serializer 81B. The control bits CTL2 and CTL3 are supplied to the encoder/serializer 81C.

The encoder/serializer 81A transmits the supplied B component of the image data, vertical synchronization signal, horizontal synchronization signal, and the additional data in a time-multiplex manner. That is, the encoder/serializer 81A converts the supplied B component of the image data into parallel data of eight bits, which is a fixed number of bits. In addition, the encoder/serializer 81A encodes the parallel data in order to convert the parallel data into serial data. Thereafter, the encoder/serializer 81A transmits the serial data using the TMDS channel #0.

Furthermore, the encoder/serializer 81A encodes the 2-bit parallel data formed from the vertical synchronization signal and the horizontal synchronization signal in order to convert the parallel data into serial data. Thereafter, the encoder/serializer 81A transmits the serial data using the TMDS channel #0. Still furthermore, the encoder/serializer 81A converts the supplied auxiliary data into 4-bit parallel data. Thereafter, the encoder/serializer 81A encodes the parallel data in order to convert the parallel data into serial data and transmits the serial data using the TMDS channel #0.

The encoder/serializer 81B transmits the supplied G component of the image data, the control bits CTL0 and CTL1, and the auxiliary data in a time multiplexing manner. That is, the encoder/serializer 81B converts the supplied G component of the image data into parallel data of eight bits, which is a fixed number of bits. In addition, the encoder/serializer 81B encodes the parallel data in order to convert the parallel data into serial data. Thereafter, the encoder/serializer 81B transmits the serial data using the TMDS channel #1.

Furthermore, the encoder/serializer 81B encodes the 2-bit parallel data formed from the supplied control bits CTL0 and CTL1 in order to convert the parallel data into serial data. Thereafter, the encoder/serializer 81B transmits the serial data using the TMDS channel #1. Still furthermore, the encoder/serializer 81B converts the supplied auxiliary data into 4-bit parallel data. Thereafter, the encoder/serializer 81B encodes the parallel data in order to convert the parallel data into serial data and transmits the serial data using the TMDS channel #1.

The encoder/serializer 81C transmits the supplied R component of the image data, the control bits CTL2 and CTL3, and the auxiliary data in a time-multiplex manner. That is, the encoder/serializer 81C converts the supplied R component of the image data into parallel data of eight bits, which is a fixed number of bits. In addition, the encoder/serializer 81C encodes the parallel data in order to convert the parallel data into serial data. Thereafter, the encoder/serializer 81C transmits the serial data using the TMDS channel #2.

Furthermore, the encoder/serializer 81C encodes the 2-bit parallel data formed from the supplied control bits CTL2 and CTL3 in order to convert the parallel data into serial data. Thereafter, the encoder/serializer 81C transmits the serial data using the TMDS channel #2. Still furthermore, the encoder/serializer 81C converts the supplied auxiliary data into 4-bit parallel data. Thereafter, the encoder/serializer 81C encodes the parallel data in order to convert the parallel data into serial data and transmits the serial data using the TMDS channel #2.

The receiver 82 includes three recovery/decoders 82A, 82B, and 82C corresponding to the three TMDS channels #0, #1, and #2, respectively. In addition, each of the recovery/decoders 82A, 82B, and 82C receives supplied image data, auxiliary data, and control data in the form of differential signals using the TMDS channels #0, #1, and #2. In addition, each of the recovery/decoders 82A, 82B, and 82C converts the image data, auxiliary data, and control data from a serial format to a parallel format, decodes the parallel data, and outputs the parallel data.

That is, the recovery/decoder 82A receives the B component of the image data, the vertical synchronization signal, the horizontal synchronization signal, and the auxiliary data in the form of differential signals transmitted using the TMDS channel #0. Thereafter, the recovery/decoder 82A converts the B component of the image data, the vertical synchronization signal, the horizontal synchronization signal, and the auxiliary data from a serial format to a parallel format, decodes the parallel data, and outputs the parallel data.

The recovery/decoder 82B receives the G component of the image data, the control bits CTL0 and CTL1, and the auxiliary data in the form of differential signals transmitted using the TMDS channel #1. Thereafter, the recovery/decoder 82B converts the G component of the image data, the control bits CTL0 and CTL1, and the auxiliary data from a serial data format to a parallel data format, decodes the parallel data, and outputs the parallel data.

The recovery/decoder 82C receives the R component of the image data, the control bits CTL2 and CTL3, and the auxiliary data in the form of differential signals transmitted using the TMDS channel #2. Thereafter, the recovery/decoder 82C converts the R component of the image data, the control bits CTL2 and CTL3, and the auxiliary data from a serial format to a parallel format, decodes the parallel data, and outputs the parallel data.

Figure 6:
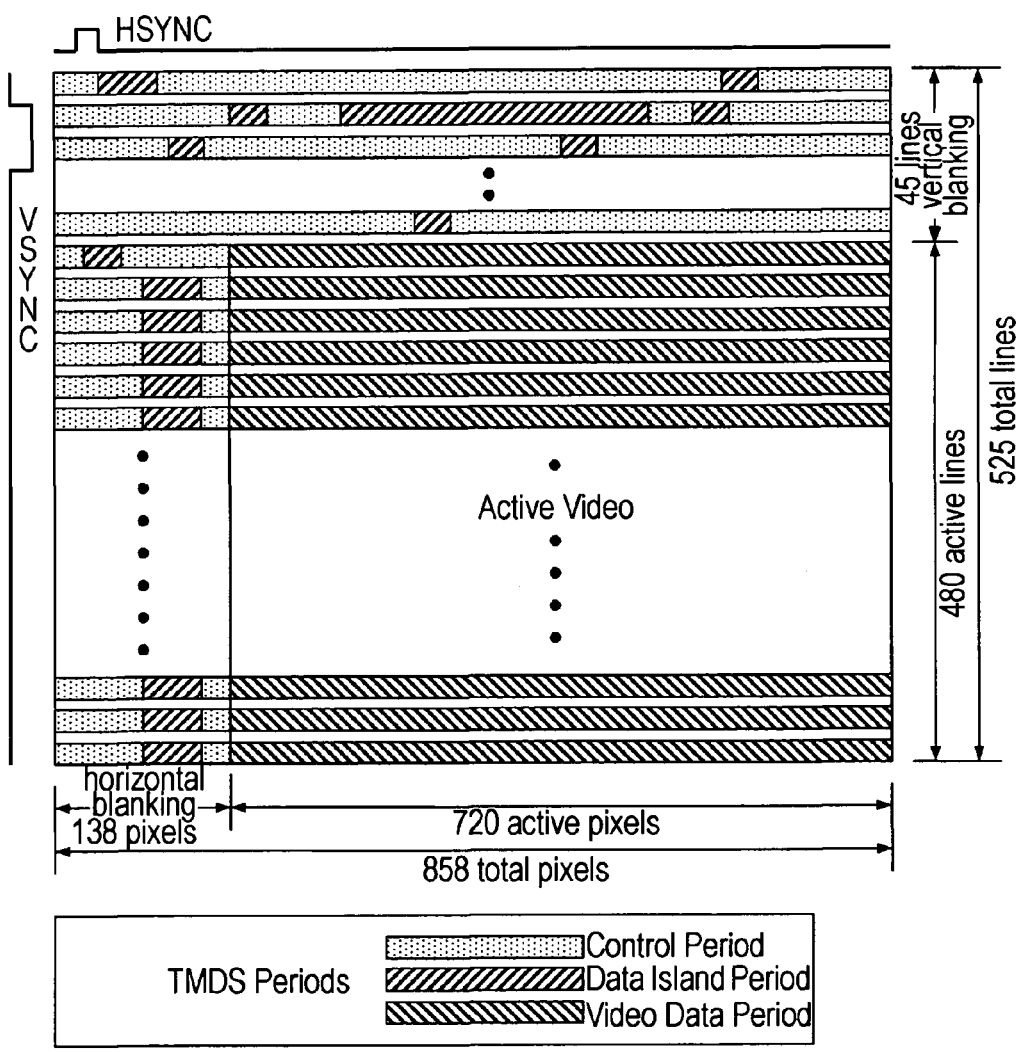
FIG. 6 is a diagram illustrating the structure of TMDS transmission data.

FIG. 6 illustrates an example of a transmission span (period) in which various transmission data items are transmitted using three HDMI TMDS channels #0, #1, and #2. Note that FIG. 6 illustrates a transmission span of various transmission data items when a progressive image having a size of 720 pixels (horizontal) by 480 pixels (vertical) is transmitted using the TMDS channels #0, #1, and #2.

A video field in which transmission data is transmitted using the three HDMI TMDS channels #0, #1, and #2 has three types of period: Video Data period, Data Island period, and Control period.

Here, the video field period is a period starting from a rising edge (an active edge) of a vertical synchronization signal to a rising edge (an active edge) of the next vertical synchronization signal. The video field period is separated into a horizontal blanking period (horizontal blanking), a vertical blanking period (vertical blanking), and an active video period (Active Video). The active video period is a period obtained by excluding the horizontal blanking period and the vertical blanking period from the video field period.

The video data period is assigned to the active video period. In the video data period, active pixel data for a size of 720 pixels by 480 lines that forms uncompressed one-screen image data is transmitted.

The data island period and the control period are assigned to the horizontal blanking period and the vertical blanking period. In the data island period and the control period, the auxiliary data is transmitted.

That is, the data island period is assigned to part of the horizontal blanking period and the vertical blanking period. In the data island period, data of the auxiliary data that is not related to control (e.g., a packet of audio data) is transmitted.

The control period is assigned to the other part of the horizontal blanking period and the vertical blanking period. In the control period, data of the auxiliary data that is related to control (e.g., a vertical synchronization signal, a horizontal synchronization signal, or a control packet) is transmitted.

According to the current HDMI specification, the frequency of the pixel clock transmitted via the TMDS clock channel is 165 MHz, for example. In this case, the transfer rate over the data island period is about 500 Mbps.

FIG. 7 illustrates an example of the pin assignment of an HDMI terminal. This pin assignment is a type-A pin assignment.

Two lines that form a differential line through which TMDS Data #i+ and TMDS Data #i− serving as a differential signal of the TMDS channel #i are transmitted are connected to pins to which the TMDS Data #i+ is assigned (pins having pin numbers of 1, 4, and 7) and pins to which the TMDS Data #i− is assigned (pins having pin numbers of 3, 6, and 9).

In addition, the CEC line 84 through which a CEC signal serving as control data is transmitted is connected to a pin having a pin number of 13. A pin having a pin number of 14 is a reserved pin. Furthermore, a line through which an SDA (Serial Data) signal, such as the E-EDID, is transmitted is connected to a pin having a pin number of 16. A line through which an SCL (Serial Clock) signal serving as a clock signal used for synchronization of transmission and reception of the SDA signal is transmitted is connected to a pin having a pin number of 15. The above-described DDC 83 is formed from the line through which the SDA signal is transmitted and the line through which the SCL signal is transmitted.

In addition, the line 86 used by the source device for, as described above, detecting that a sink device is connected thereto is connected to a pin having a pin number of 19. Furthermore, the line 87 used for power supply, as described above, is connected to a pin having a pin number of 18.

Figure 8:
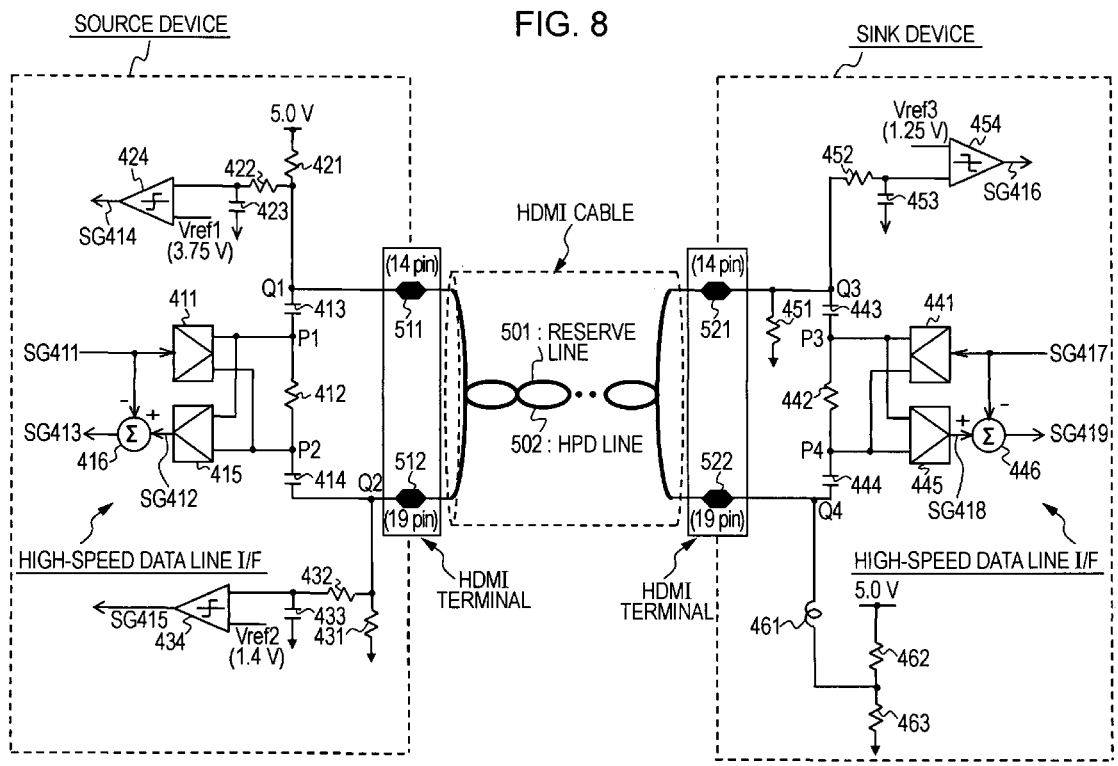
FIG. 8 is a diagram illustrating an exemplary configuration of a communication unit that performs LAN communication between a source device and a sink device.

FIG. 8 illustrates an exemplary configuration of the high-speed data line interface of a source device and a sink device. The high-speed data line interface forms a communication unit that performs LAN (Local Area Network) communication. The communication unit performs communication by using a bidirectional communication path formed from a pair of differential lines among a plurality of lines that form an HDMI cable, that is, a reserve line (Ether− line) corresponding to the Reserve pin (No. 14 pin) and an HPD line (Ether+ line) corresponding to the HPD pin (No. 19 pin) in the present embodiment.

The source device includes a LAN signal transmitting circuit 411, a terminating resistor 412, AC coupling capacitors 413 and 414, a LAN signal receiving circuit 415, a subtraction circuit 416, a pull-up resistor 421, a resistor 422 and a capacitor 423 that form a lowpass filter, a comparator 424, a pull-down resistor 431, a resistor 432 and a capacitor 433 that form a lowpass filter, and a comparator 434. Here, the high-speed data line interface (the high-speed data line I/F) is formed from the LAN signal transmitting circuit 411, the terminating resistor 412, the AC coupling capacitors 413 and 414, the LAN signal receiving circuit 415, and the subtraction circuit 416.

A series circuit of the pull-up resistor 421, the AC coupling capacitor 413, the terminating resistor 412, the AC coupling capacitor 414, and a pull-down resistor 431 is connected between a power supply line (+5.0 V) and a ground line. A connection point P1 of the AC coupling capacitor 413 and the terminating resistor 412 is connected to a positive output side of the LAN signal transmitting circuit 411 and a positive output side of the LAN signal receiving circuit 415. In addition, a connection point P2 of the AC coupling capacitor 414 and the terminating resistor 412 is connected to a negative output side of the LAN signal transmitting circuit 411 and a negative output side of the LAN signal receiving circuit 415. A transmission signal (transmission data) SG411 is supplied to the input side of the LAN signal transmitting circuit 411.

In addition, an output signal SG412 output from the LAN signal receiving circuit 415 is supplied to the positive side terminal of the subtraction circuit 416, while the transmission signal (transmission data) SG411 is supplied to the negative side terminal of the subtraction circuit 416. In the subtraction circuit 416, the transmission signal SG411 is subtracted from the output signal SG412 output from the LAN signal receiving circuit 415 so that a received signal (received data) SG413 can be obtained.

In addition, a connection point Q1 of the pull-up resistor 421 and the AC coupling capacitor 413 is connected to the ground line via a series circuit of the resistor 422 and the capacitor 423. In addition, an output signal of the lowpass filter obtained at the connection point of the resistor 422 and the capacitor 423 is supplied to one of input terminals of the comparator 424. In the comparator 424, the output signal output from the lowpass filter is compared with a reference voltage Vref1 (+3.75 V) supplied to the other input terminal. An output signal SG414 output from the comparator 424 is supplied to the control unit (the CPU) of the source device.

In addition, a connection point Q2 of the AC coupling capacitor 414 and the pull-down resistor 431 is connected to the ground line via a series circuit of a resistor 432 and a capacitor 433. In addition, an output signal of the lowpass filter obtained at the connection point of the resistor 432 and the capacitor 433 is supplied to one of input terminals of the comparator 434. In the comparator 434, the output signal output from the lowpass filter is compared with a reference voltage Vref2 (+1.4 V) supplied to the other input terminal. An output signal SG415 output from the comparator 434 is supplied to the control unit (the CPU) of the source device.

The sink device includes a LAN signal transmitting circuit 441, a terminating resistor 442, AC coupling capacitors 443 and 444, a LAN signal receiving circuit 445, a subtraction circuit 446, a pull-down resistor 451, a resistor 452 and a capacitor 453 that form a lowpass filter, a comparator 454, a choke coil 461, a resistor 462, and a resistor 463. Here, the high-speed data line interface (high-speed data line I/F) is formed from the LAN signal transmitting circuit 441, the terminating resistor 442, the AC coupling capacitors 443 and 444, the LAN signal receiving circuit 445, and the subtraction circuit 446.

A series circuit of the resistor 462 and the resistor 463 is connected between the power supply line (+5.0 V) and the ground line. In addition, a series circuit of the choke coil 461, the AC coupling capacitor 444, the terminating resistor 442, the AC coupling capacitor 443, and the pull-down resistor 451 is connected between the ground line and the connection point of the resistor 462 and the resistor 463.

A connection point P3 of the AC coupling capacitor 443 and the terminating resistor 442 is connected to a positive output side of the LAN signal transmitting circuit 441 and a positive output side of the LAN signal receiving circuit 445. In addition, a connection point P4 of the AC coupling capacitor 444 and the terminating resistor 442 is connected to a negative output side of the LAN signal transmitting circuit 441 and a negative output side of the LAN signal receiving circuit 445. A transmission signal (transmission data) SG417 is supplied to the input side of the LAN signal transmitting circuit 441.

In addition, an output signal SG418 output from the LAN signal receiving circuit 445 is supplied to the positive side terminal of the subtraction circuit 446, while the transmission signal SG417 is supplied to the negative side terminal of the subtraction circuit 446. In the subtraction circuit 446, the transmission signal SG417 is subtracted from the output signal SG418 output from the LAN signal receiving circuit 445 so that a received signal (received data) SG419 can be obtained.

In addition, a connection point Q3 of the pull-down resistor 451 and the AC coupling capacitor 443 is connected to the ground line via a series circuit of the resistor 452 and the capacitor 453. In addition, an output signal of the lowpass filter obtained at the connection point of the resistor 452 and the capacitor 453 is supplied to one of input terminals of the comparator 454. In the comparator 454, the output signal output from the lowpass filter is compared with a reference voltage Vref3 (+1.25 V) supplied to the other input terminal. An output signal SG416 output from the comparator 454 is supplied to the control unit (the CPU) of the sink device.

A reserve line 501 and an HPD line 502 contained in an HDMI cable form a differential twisted pair. A source-side end 511 of the reserve line 501 is connected to the No. 14 pin of the HDMI terminal of the source device, while a sink-side end 521 of the reserve line 501 is connected to the No. 14 pin of the HDMI terminal of the sink device. In addition, a source-side end 512 of the HPD line 502 is connected to the No. 19 pin of the HDMI terminal of the source device, while a sink-side end 522 of the HPD line 502 is connected to the No. 19 pin of the HDMI terminal of the sink device.

In the source device, the above-described connection point Q1 of the pull-up resistor 421 and the AC coupling capacitor 413 is connected to the No. 14 pin of the HDMI terminal. In addition, the above-described connection point Q2 of the pull-down resistor 431 and the AC coupling capacitor 414 is connected to the No. 19 pin of the HDMI terminal. While, in the sink device, the above-described connection point Q3 of the pull-down resistor 451 and the AC coupling capacitor 443 is connected to the No. 14 pin of the HDMI terminal. In addition, the above-described connection point Q4 of the choke coil 461 and the AC coupling capacitor 444 is connected to the No. 19 pin of the HDMI terminal.

The operation of LAN communication performed by the high-speed data line interface having the above-described configuration is described next.

In the source device, the transmission signal (transmission data) SG411 is supplied to the input side of the LAN signal transmitting circuit 411, and a differential signal (a positive output signal and a negative output signal) corresponding to the transmission signal SG411 is output from the LAN signal transmitting circuit 411. In addition, the differential signal output from the LAN signal transmitting circuit 411 is supplied to the connection points P1 and P2 and is transmitted to the sink device via a pair of lines (the reserve line 501 and the HPD line 502) of the HDMI cable.

In addition, in the sink device, the transmission signal (transmission data) SG417 is input to the input side of the LAN signal transmitting circuit 441. The LAN signal transmitting circuit 441 outputs a differential signal (a positive output signal and a negative output signal) corresponding to the transmission signal SG417. In addition, the differential signal output from the LAN signal transmitting circuit 441 is supplied to the connection points P3 and P4 and is transmitted to the source device via the pair of lines (the reserve line 501 and the HPD line 502) of the HDMI cable.

In addition, in the source device, since the input side of the LAN signal receiving circuit 415 is connected to the connection points P1 and P2, a sum signal of a transmission signal corresponding to a differential signal (an electrical current signal) output from the LAN signal transmitting circuit 411 and a reception signal corresponding to a differential signal transmitted from the sink device in the above-described manner can be obtained as the output signal SG412 output from the LAN signal receiving circuit 415. In the subtraction circuit 416, the transmission signal SG411 is subtracted from the output signal SG412 output from the LAN signal receiving circuit 415. Accordingly, the output signal SG413 output from the subtraction circuit 416 corresponds to the transmission signal (transmission data) SG417 received from the sink device.

In addition, in the sink device, since the input side of the LAN signal receiving circuit 445 is connected to the connection points P3 and P4, a sum signal of a transmission signal corresponding to a differential signal (an electrical current signal) output from the LAN signal transmitting circuit 441 and a reception signal corresponding to a differential signal transmitted from the source device in the above-described manner can be obtained as the output signal SG418 output from the LAN signal receiving circuit 445. In the subtraction circuit 446, the transmission signal SG417 is subtracted from the output signal SG418 output from the LAN signal receiving circuit 445. Accordingly, the output signal SG419 output from the subtraction circuit 446 corresponds to the transmission signal (transmission data) SG411 received from the source device.

In this way, bidirectional LAN communication can be performed between the high-speed data line interface of the source device and the high-speed data line interface of the sink device.

Note that, in FIG. 8, in addition to performing the above-described LAN communication, the HPD line 502 sends, to the source device, information indicating that an HDMI cable is connected to the sink device using a DC bias level. That is, when an HDMI cable is connected to the sink device, the resistors 462 and 463 and the choke coil 461 in the sink device biases the HPD line 502 using the No. 19 pin so that the HPD line 502 has about 4 V. The source device extracts the DC bias of the HPD line 502 using the lowpass filer formed from the resistor 432 and the capacitor 433 and compares the DC bias with the reference voltage Vref2 (e.g., 1.4 V) using the comparator 434.

When the HDMI cable is not connected to the sink device, the voltage of the No. 19 pin of the HDMI terminal of the source device is lower than the reference voltage Vref2, since the pull-down resistor 431 is present. In contrast, when the HDMI cable is connected to the sink device, the voltage of the No. 19 pin of the HDMI terminal of the source device is higher than the reference voltage Vref2. Accordingly, when the HDMI cable is not connected to the sink device, the output signal SG415 of the comparator 434 is at a high level. Otherwise, the output signal SG415 of the comparator 434 is at a low level. Therefore, the control unit (the CPU) of the source device can determine whether an HDMI cable is connected to the sink device on the basis of the output signal SG415 output from the comparator 434.

In addition, in FIG. 8, a function is provided in which each of devices connected to ends of the HDMI cable recognizes whether the other device is a LAN communication compliant device (hereinafter referred to as an "e-HDMI compliant device") or a non-LAN communication compliant device (hereinafter referred to as a "non-e-HDMI compliant device") using the DC bias potential of the reserve line 501.

As described above, the source device pulls up the reserve line 501 (to +5 V) using the resistor 421 and, the sink device pulls down the reserve line 501 using the resistor 451. The resistors 421 and 451 are not provided in a non-e-HDMI compliant device.

As described above, the source device compares the DC potential of the reserve line 501 passing through the lowpass filter formed from the resistor 422 and the capacitor 423 with the reference voltage Vref1 using the comparator 424. When the sink device is an e-HDMI compliant device and, therefore, the sink device includes the pull-down resistor 451, the voltage of the reserve line 501 is 2.5 V. However, when the sink device is a non-e-HDMI compliant device and, therefore, the sink device does not include the pull-down resistor 451, the voltage of the reserve line 501 is 5 V due to the presence of the pull-up resistor 421.

Accordingly, when, for example, the reference voltage Vref1 is set to 3.75 V, the output signal SG414 output from the comparator 424 is at a low level if the sink device is an e-HDMI compliant device. However, the output signal SG414 output from the comparator 424 is at a high level if the sink device is not an e-HDMI compliant device. Therefore, the control unit (the CPU) of the source device can determine whether the sink device is an e-HDMI compliant device on the basis of the output signal SG414 output from the comparator 424.

Similarly, as described above, the sink device compares the DC potential of the reserve line 501 passing through the lowpass filter formed from the resistor 452 and the capacitor 453 with the reference voltage Vref3 using the comparator 454. When the source device is an e-HDMI compliant device and, therefore, the source device includes the pull-up resistor 421, the voltage of the reserve line 501 is 2.5 V. However, when the source device is a non-e-HDMI compliant device and, therefore, the source device does not include the pull-up resistor 421, the voltage of the reserve line 501 is 0 V due to the presence of the pull-down resistor 451.

Accordingly, when, for example, the reference voltage Vref3 is set to 1.25 V, the output signal SG416 output from the comparator 454 is at a high level if the source device is an e-HDMI compliant device. However, the output signal SG416 output from the comparator 454 is at a low level if the source device is not an e-HDMI compliant device. Therefore, the control unit (the CPU) of the sink device can determine whether the source device is an e-HDMI compliant device on the basis of the output signal SG416 output from the comparator 454.

According to the exemplary configuration illustrated in FIG. 8, in the interface in which video and audio data transmission, exchange and authentication of connected device information, communication of device control data, and LAN communication are performed using a single HDMI cable, the LAN communication is performed using bidirectional communication via a pair of differential transmission lines. In addition, the connection state of the interface can be sent using the DC bias potential of at least one of the differential transmission lines. Accordingly, spatial separation can be available without physically using the SCL line and the SDA line for LAN communication. As a result, a circuit for LAN communication can be formed regardless of the electrical specification defined for the DDC, and therefore, stable and reliable LAN communication is realized at low cost.

Note that the pull-up resistor 421 illustrated in FIG. 8 may be provided in an HDMI cable, not the source device. In such a case, one of the terminals of the pull-up resistor 421 is connected to the reserve line 501 provided in the HDMI cable, and the other terminal is connected to a line (a signal line) connected to the power supply (the power supply potential) provided in the HDMI cable.

Furthermore, the pull-down resistor 451 and the resistor 463 illustrated in FIG. 8 may be provided in an HDMI cable, not the sink device. In such a case, one of the terminals of the pull-down resistor 451 is connected to the reserve line 501, and the other terminal is connected to a line (a ground line) connected to ground (the reference voltage) in the HDMI cable. In addition, one of the terminals of the resistor 463 is connected to the HPD line 502, and the other terminal is connected to a line (a ground line) connected to ground (the reference voltage) in the HDMI cable.

Processing for detecting an abnormal connection state, that is, a loop connection state of the television receiver 130 (loop detection processing) is described next.

According to the present embodiment, when performing processing for detecting a loop connection state, that is, loop detection processing, the control unit 136 counts the number of broadcast packets reaching the network terminals 131$a$ to 131$e$, that is, the number of broadcast packets input to the ports 132b to 132f of the switching hub 133 within a predetermined time period. Thereafter, the control unit 136 compares each of the count values with a threshold value so as to determine network terminals that form loop connection. Thus, the control unit 136 forms a packet counting unit and a loop determination unit. For example, the control unit 136 performs the loop detection processing when power is turned on.

Figure 9:
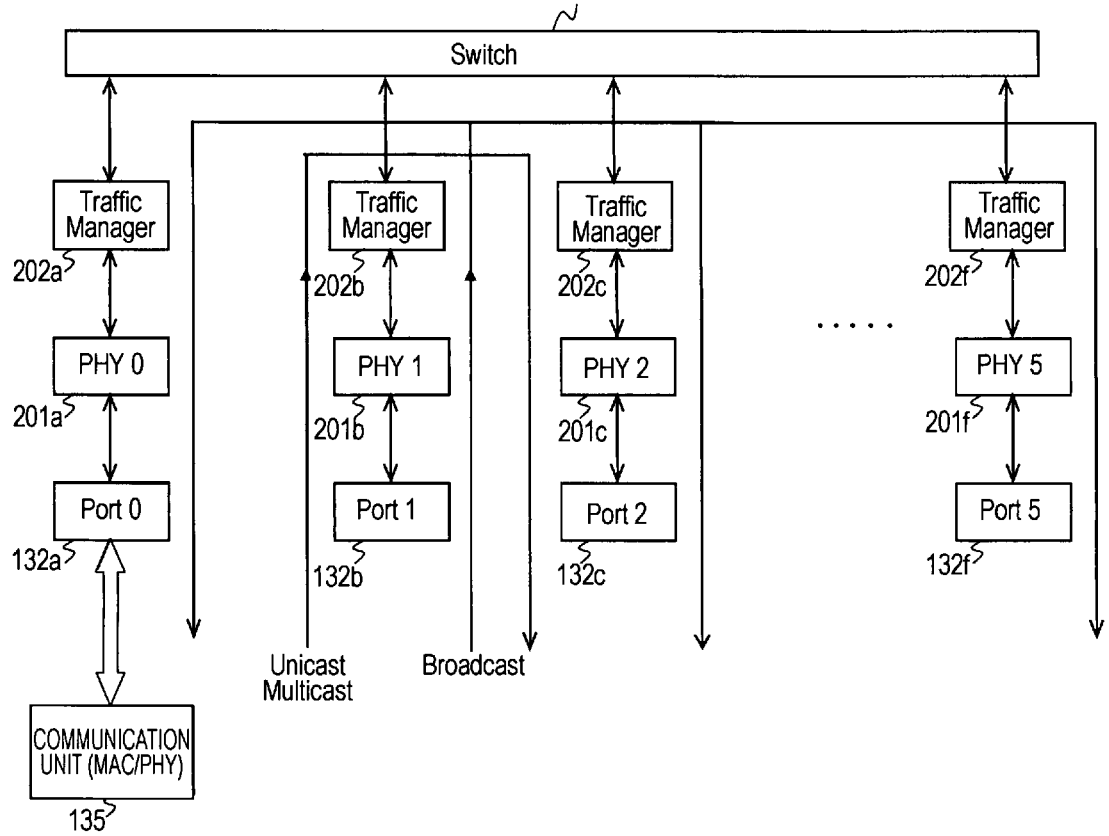
FIG. 9 is a diagram illustrating the operation performed by the switching hub (when a loop is not present).

For example, as shown in FIG. 9, when a unicast packet or a multicast packet having a destination address associated with a device connected to the port 132c (Port 2) is input to the port 132b (Port 1) of the switching hub 133, the packet is output to the port 132c (Port 2). In addition, as shown in FIG. 9, when a broadcast packet is input to the port 132b (Port 1) of the switching hub 133, the packet is output to all of the other ports.

Figure 10:
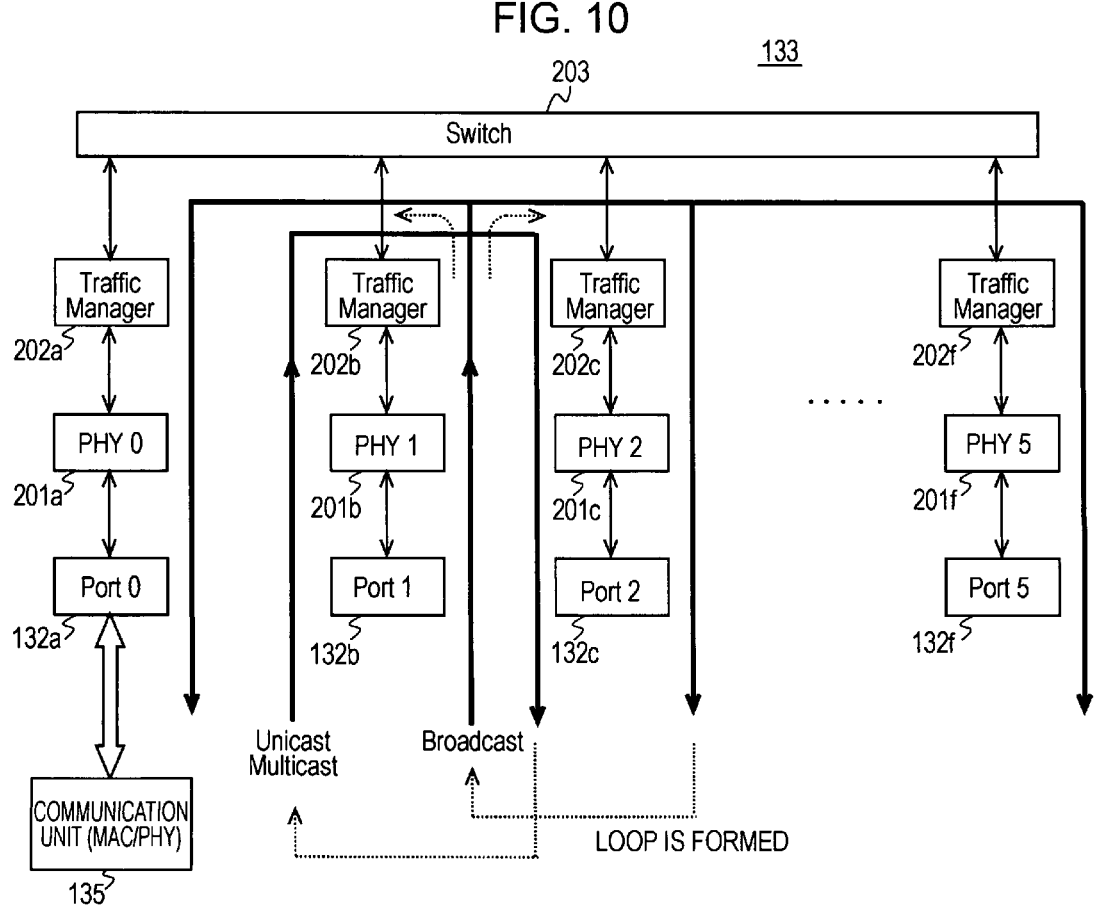
FIG. 10 is a diagram illustrating the operation performed by the switching hub (when a loop is present).

Here, suppose that the network terminals 131a and 131b corresponding to the ports 132b and 132c, respectively, form a loop connection state. Then, as shown in FIG. 10, a packet, such as a broadcast packet, continuously travels in a loop. Therefore, the number of data packets that reach the port 132b significantly increases.

Note that, for a unicast packet and a multicast packet, even when a loop is not formed, the number of the packets may increase depending on a communication situation. In contrast, for a broadcast packet, the number of packets that reach each of the ports is significantly small in a normal connection mode.

Accordingly, as described above, by counting the number of broadcast packets input to the ports 132b to 132f of the switching hub 133 within a predetermined time period and, subsequently, comparing each of the count values with a threshold value, network terminals forming loop connection can be determined.

Figure 11:
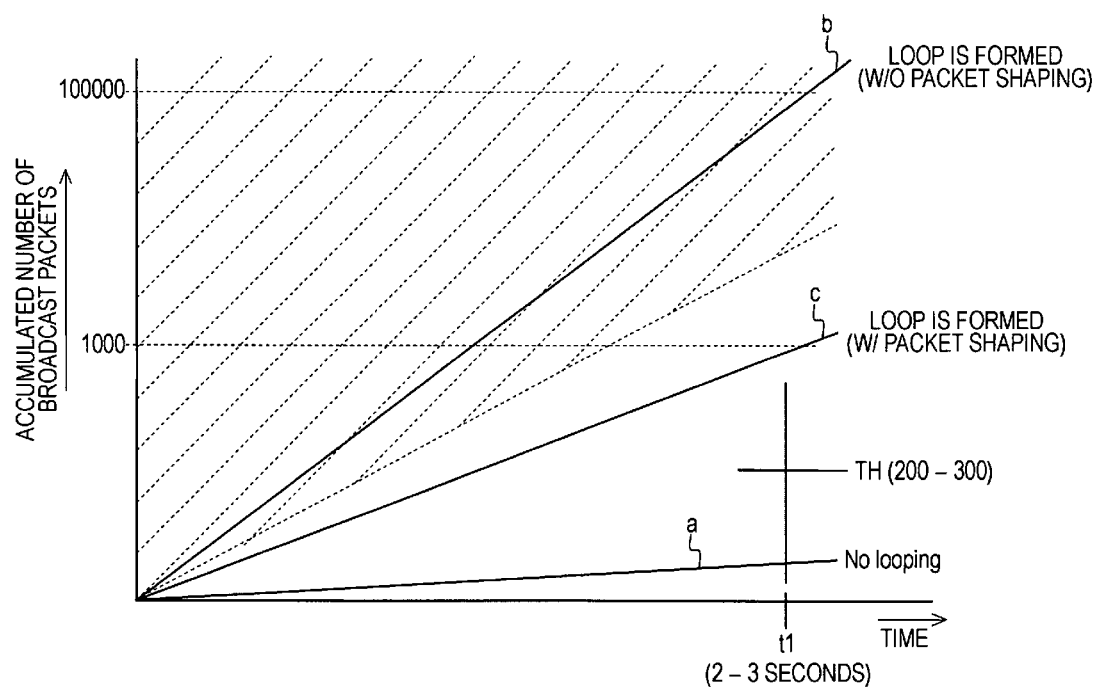
FIG. 11 illustrates a relationship between an elapsed time and the accumulated number of broadcast packets.

FIG. 11 illustrates a relationship between an elapsed time and the accumulated number of broadcast packets. As indicated by a line a shown in FIG. 11, if a loop (a loop connection state) is not formed, the increase rate of the accumulated number of broadcast packets with respect to an elapsed time is low. However, as indicated by a line b shown in FIG. 11, if a loop is formed, the increase rate of the accumulated number of broadcast packets with respect to an elapsed time is significantly high.

Note that, as described above, a broadcast packet input to one of the ports is output to all of the other ports. Accordingly, if, as described above, a loop is formed, the number of broadcast packets supplied from the port 132a (Port 0) to the communication unit 135 significantly increases.

If the number of broadcast packets exceeds a predetermined value, the CPU utilization of the control unit 136 reaches 100% only for packet processing (kernel processing), and therefore, the control unit 136 cannot perform loop detection processing. Accordingly, in the present embodiment, as described above, when the control unit 136 performs loop detection processing, the transmission bandwidth from the port 132a (Port 0) of the switching hub 133 to the communication unit 135 is limited to a certain bandwidth (e.g., 1 Mbps). In FIG. 11, an area indicated by hatching with dotted lines represents an area in which the CPU cannot continue processing.

A line c shown in FIG. 11 indicates a relationship between the accumulated number of broadcast packets and a time when a loop is formed and the transmission bandwidth from the port 132a (Port 0) of the switching hub 133 to the communication unit 135 is limited (shaped) to a predetermined bandwidth. In this case, the number of broadcast packets supplied from the port 132a (Port 0) of the switching hub 133 to the communication unit 135 is within the range that is processible by the CPU of the control unit 136.

As described above, by counting the number of broadcast packets input to the ports 132b to 132f of the switching hub 133 within a predetermined time period and comparing each of the count values with a predetermined value, network terminals that form a loop connection state can be determined. For example, a threshold value TH is determined as follows. That is, as shown in FIG. 11, the threshold value TH is set to an approximately middle value between the value of the line a and the value of the line c at a predetermined time (t1). For example, when t1 is 2 to 3 seconds, TH is about 200 to 300.

Note that, according to the present embodiment, when the control unit 136 performs loop detection processing, the communication unit 135 is controlled so as to transmit, via the switching hub 133, a broadcast packet to transmission paths (an Ethernet cable and an HDMI cable) connected to the network terminals 131a to 132f at a constant frequency.

Basically, almost all of data packets flowing in a network are unicast packets. Broadcast packets rarely flow in the network. Accordingly, as described above, when the control unit 136 performs loop detection processing, broadcast packets travels in the network by transmitting broadcast packets to the transmission lines at a constant frequency. Therefore, loop detection can be reliably performed.

An example of loop detection processing performed by the control unit 136 is described next with reference to FIG. 12.

First, when power is turned on, the control unit 136, in step ST1, starts loop detection processing. In this case, the control unit 136 sets the mode of at least the traffic manager 202a corresponding to the port 132a (Port 0) to a mode in which the traffic manager 202a preferentially outputs a broadcast packet and in which the transmission bandwidth is limited to a predetermined bandwidth. Note that the control unit 136 may also set the modes of the traffic managers 202b to 202f corresponding to the other ports 132b to 132f (Port 1 to Port 5) to the mode that is the same as the mode of the traffic manager 202a. In addition, the control unit 136 inputs broadcast packets from the communication unit 135 to the port 132a of the switching hub 133 at a constant frequency so that the broadcast packets flow in the network.

Subsequently, in step ST2, the control unit 136 counts the number of broadcast packets supplied from the port 132a (Port 0) of the switching hub 133 to the communication unit 135 within a predetermined time period. In this case, the control unit 136 performs the counting operation using the control register 204 of the switching hub 133.

Subsequently, in step ST3, the control unit 136 determines whether the number of packets counted in step ST2 is greater than the threshold value TH (refer to FIG. 11). If the number of packets is not greater than the threshold value TH, the processing immediately proceeds to step ST4, where the control unit 136 completes the loop detection processing. In this case, the mode in which a broadcast packet is preferentially output, the mode in which the transmission bandwidth is limited to a predetermined bandwidth, and the mode in which a broadcast packet is input from the communication unit 135 to the port 132a of the switching hub 133 at a constant frequency activated in step ST1 as described above are deactivated.

However, if the number of packets is greater than the threshold value TH, the control unit 136 determines that an abnormal connection state, that is, a loop connection state is detected. The control unit 136 then starts processing for identifying network terminals that form the loop connection state.

That is, if the number of packets is greater than the threshold value TH, the control unit 136 performs processing in step ST5.

In step ST5, the control unit 136 reaches each of the network terminals (each of the network terminals 131*a* to 131*e*). That is, the control unit 136 counts the number of broadcast packets input to each of the ports of the switching hub 133 (the ports 132*b* to 132*f*). In this case, the control unit 136 performs the counting operation using the control register 204 of the switching hub 133.

Subsequently, in step ST6, the control unit 136 determines whether a network terminal having the number of packets counted in step ST5 that is greater than the threshold value TH (refer to FIG. 11) is present. If any abnormally connected terminal is not present, the processing immediately proceeds to step ST4, where the control unit 136 completes the loop detection processing. However, if an abnormally connected terminal is present, the control unit 136 performs processing in step ST7.

In step ST7, the control unit 136 displays, on the display panel 138, a message indicating the occurrence of abnormal connection and the abnormally connected terminals and a message prompting a user to change the connection. Thus, the control unit 136 and the display panel 138 form an information display unit. After the processing in step ST7 is performed, the control unit 136, in step ST4, completes the loop detection processing.

Figure 12:
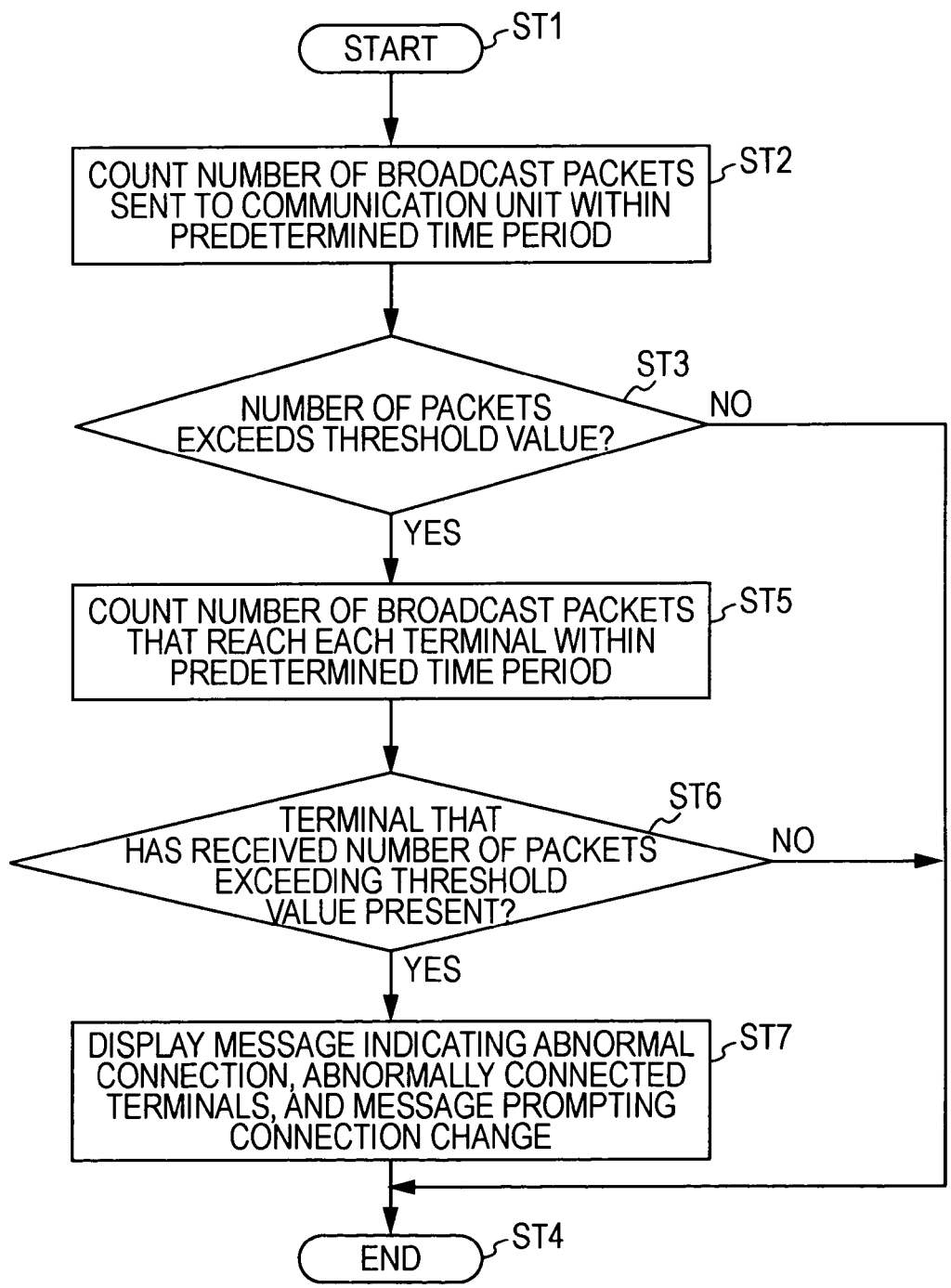
FIG. 12 is a flowchart of an example of loop detection processing performed by a control unit of the television receiver.

When loop detection processing as illustrated in FIG. 12 is performed and if a loop connection state is detected, that is, if a loop is formed, a message indicating that information and the network terminals that form the loop (the abnormally connected terminals) are displayed on the display panel 138. Accordingly, the user can change the connection and easily remove the abnormal connection state.

For example, for the connection state of the AV system 100 shown in FIG. 1, the network terminals 131*a*, 131*b*, and 131*e* may be displayed on the control unit 136 as network terminals that form a loop connection state, that is, abnormally connected terminals. In this case, the loop connection state can be removed by, for example, disconnecting the cables connected to the abnormally connected terminals.

Figure 13:
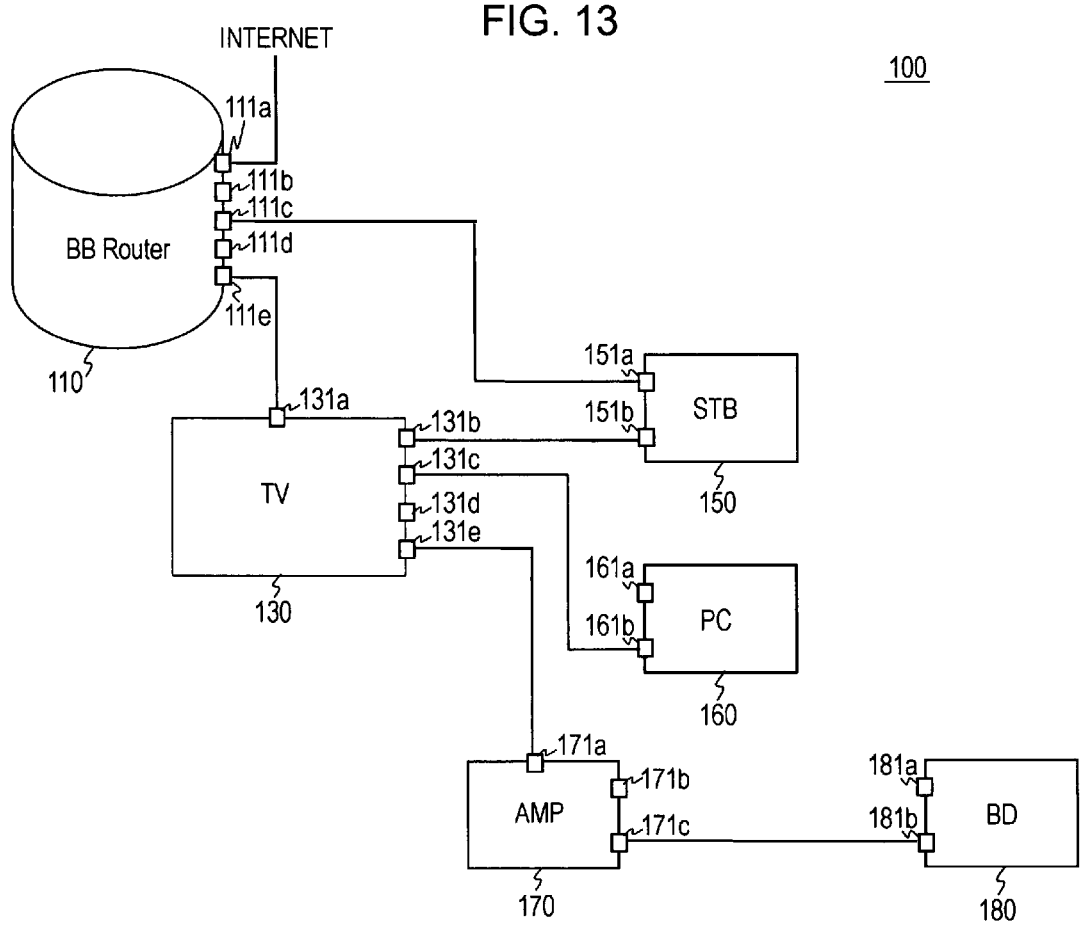
FIG. 13 is a diagram illustrating an example of connection among various apparatuses included in the AV system.
Figure 14:
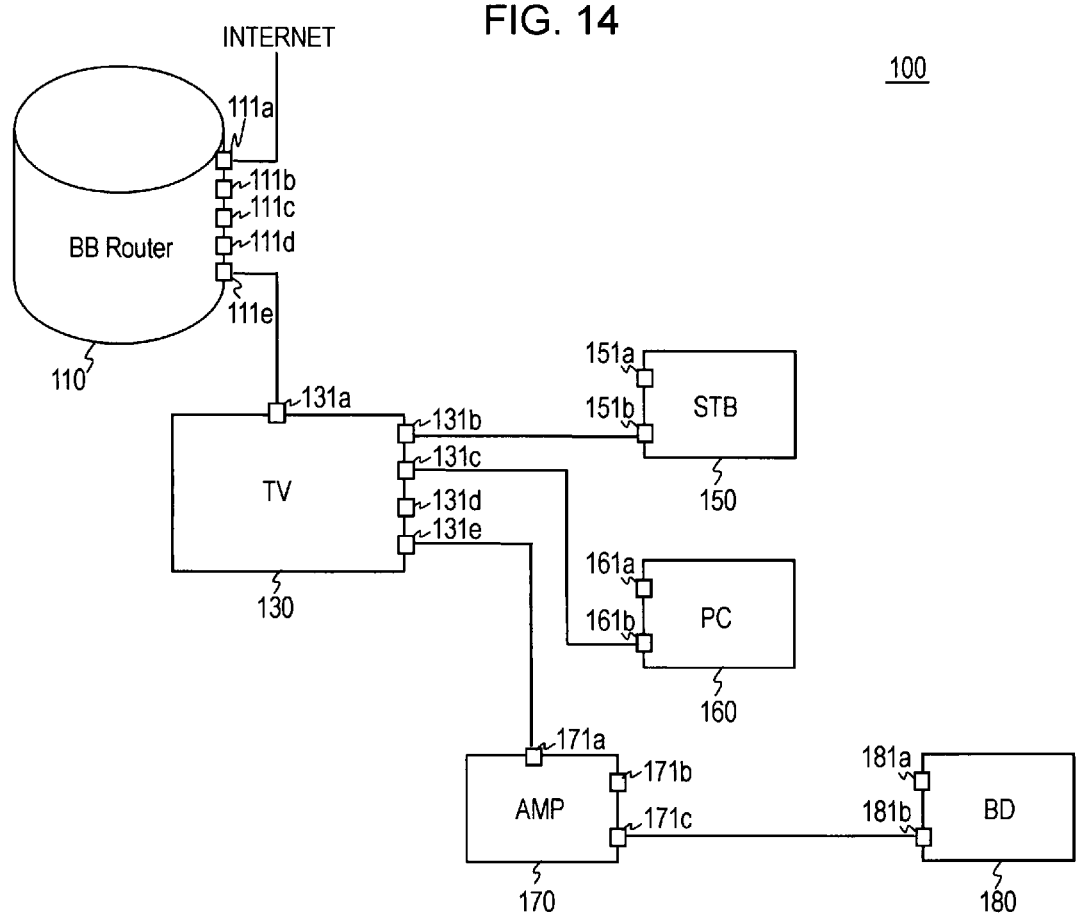
FIG. 14 is a diagram illustrating an example of connection among various apparatuses included in the AV system.

In addition, for example, for the connection state shown in FIG. 13, the network terminals 131*a* and 131*b* may be displayed on the control unit 136 as network terminals that form a loop connection state, that is, abnormally connected terminals. In this case, the loop connection state can be removed by, for example, disconnecting the cables connected to the abnormally connected terminals. Furthermore, for the connection state shown in FIG. 14, it can be considered that the network terminals that form a loop connection state, that is, abnormally connected terminals are not present.

An example of loop detection processing performed by the control unit 136 is described next with reference to FIG. 15.

First, when power is turned on, the control unit 136, in step ST11, starts loop detection processing. In this case, the control unit 136 sets the mode of at least the traffic manager 202*a* corresponding to the port 132*a* (Port 0) to a mode in which the traffic manager 202*a* preferentially outputs a broadcast packet and in which the transmission bandwidth is limited to a predetermined bandwidth. Note that the control unit 136 may also set the modes of the traffic managers 202*b* to 202*f* corresponding to the other ports 132*b* to 132*f* (Port 1 to Port 5) to the mode that is the same as the mode of the traffic manager 202*a*. In addition, the control unit 136 inputs broadcast packets from the communication unit 135 to the port 132*a* of the switching hub 133 at a constant frequency so that the broadcast packets flow in the network.

Subsequently, in step ST12, the control unit 136 counts the number of broadcast packets supplied from the port 132*a* (Port 0) of the switching hub 133 to the communication unit 135 within a predetermined time period. In this case, the control unit 136 performs the counting operation using the control register 204 of the switching hub 133.

Subsequently, in step ST13, the control unit 136 determines whether the number of packets counted in step ST12 is greater than the threshold value TH (refer to FIG. 11). If the number of packets is not greater than the threshold value TH, the processing immediately proceeds to step ST14, where the control unit 136 completes the loop detection processing. In this case, the mode in which a broadcast packet is preferentially output, the mode in which the transmission bandwidth is limited to a predetermined bandwidth, and the mode in which a broadcast packet is input from the communication unit 135 to the port 132*a* of the switching hub 133 at a constant frequency activated in step ST11 as described above are deactivated.

However, if the number of packets is greater than the threshold value TH, the control unit 136 determines that an abnormal connection state, that is, a loop connection state is detected. The control unit 136 then starts processing for identifying network terminals that form the loop connection state. That is, if the number of packets is greater than the threshold value TH, the control unit 136 performs processing in step ST15.

In step ST15, the control unit 136 reaches each of the network terminals (each of the network terminals 131*a* to 131*e*). That is, the control unit 136 counts the number of broadcast packets input to each of the ports of the switching hub 133 (the ports 132*b* to 132*f*). In this case, the control unit 136 performs the counting operation using the control register 204 of the switching hub 133.

Subsequently, in step ST16, the control unit 136 determines whether a network terminal having the number of packets counted in step ST15 that is greater than the threshold value TH (refer to FIG. 11) is present. If any abnormally connected terminal is not present, the processing immediately proceeds to step ST14, where the control unit 136 completes the loop detection processing. However, if an abnormally connected terminal is present, the control unit 136 performs processing in step ST17.

In step ST17, the control unit 136 displays, on the display panel 138, a message indicating the occurrence of abnormal connection and the abnormally connected terminals and a message prompting a user to select blocking of communication with the abnormally connected terminals. Thus, the control unit 136 and the display panel 138 form an information display unit. Thereafter, in step ST18, the control unit 136 determines whether the user select blocking of communication. Here, if a plurality of abnormally connected terminals are present, all of the abnormally connected terminals are displayed on the display panel 138. Accordingly, the user can select blocking of communication for each of the abnormally connected terminals.

If the user does not select blocking of communication, the processing immediately proceeds to step ST14, where the control unit 136 completes the loop detection processing. However, if the user selects blocking of communication, the control unit 136 performs processing in step ST19. In step ST19, the control unit 136 blocks communication of the abnormally connected terminal for which blocking of communication has been selected. Thus, the control unit 136 forms a communication blocking control unit. Thereafter, the processing proceeds to step ST14, where the control unit 136 completes the loop detection processing.

Figure 15:
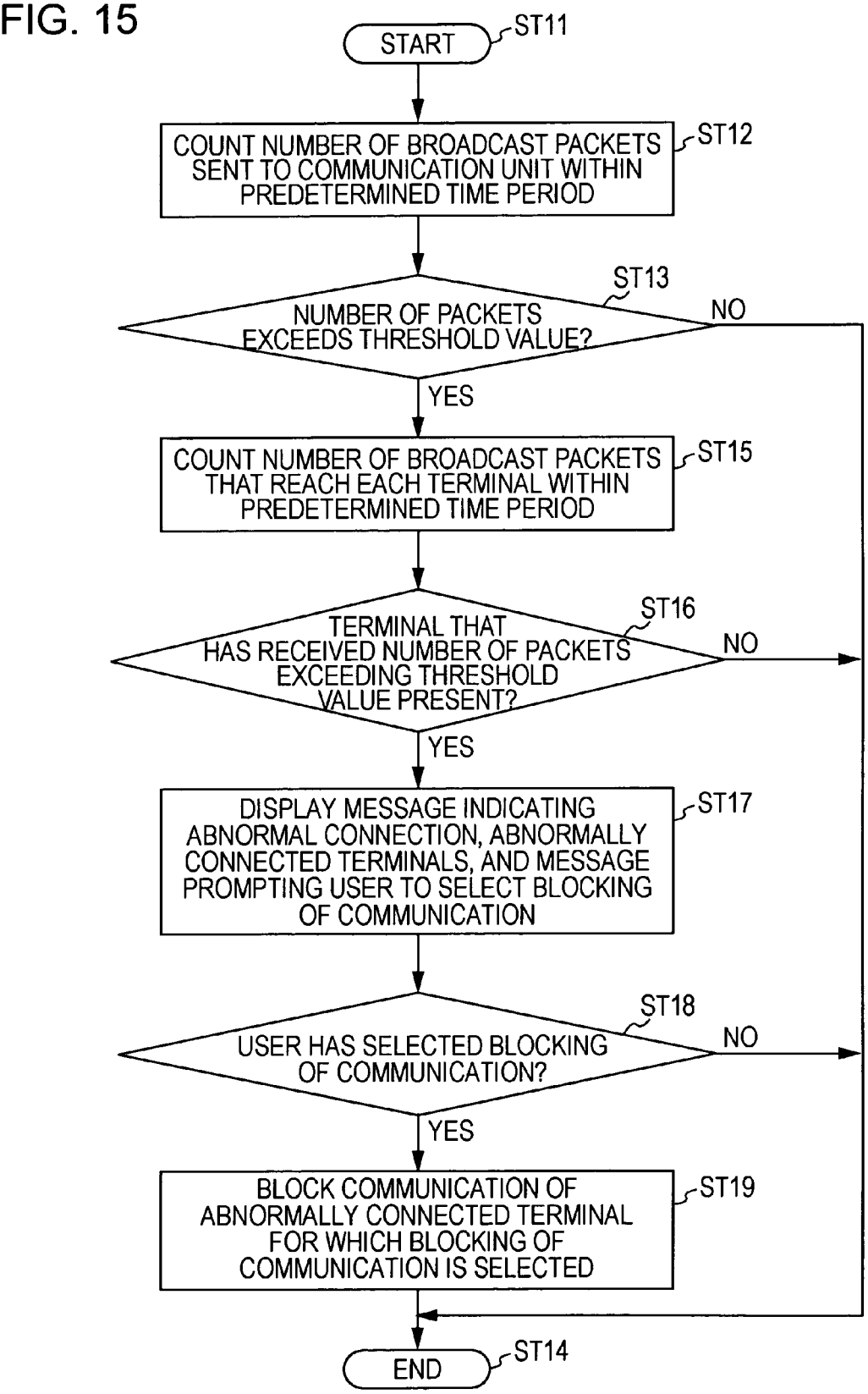
FIG. 15 is a flowchart of another example of loop detection processing performed by a control unit of the television receiver.

When loop detection processing as illustrated in FIG. 15 is performed and if a loop connection state is detected, that is, if a loop is formed, a message indicating that information and the network terminals that form the loop (the abnormally connected terminals) are displayed on the display panel 138. Accordingly, the user can change the connection and easily remove the abnormal connection state. In addition, in this case, a message prompting the user to select blocking of communication of the abnormally connected terminals is displayed on the display panel 138, and communication of the abnormally connected terminals for which the user has selected blocking of communication is automatically blocked. Accordingly, a troublesome operation in which the user disconnects the cable from the incorrectly connected terminal can be eliminated. Furthermore, blocking of communication that the user does not desire can be prevented.

Note that if the cable is disconnected from or connection is changed for the network terminal for the network terminals for which communication has been blocked through the loop detection processing illustrated in FIG. 15, the loop connection state may disappear. In such a case, it is desirable that the blocking of communication set through the loop detection processing illustrated in FIG. 15 be automatically canceled.

Figure 16:
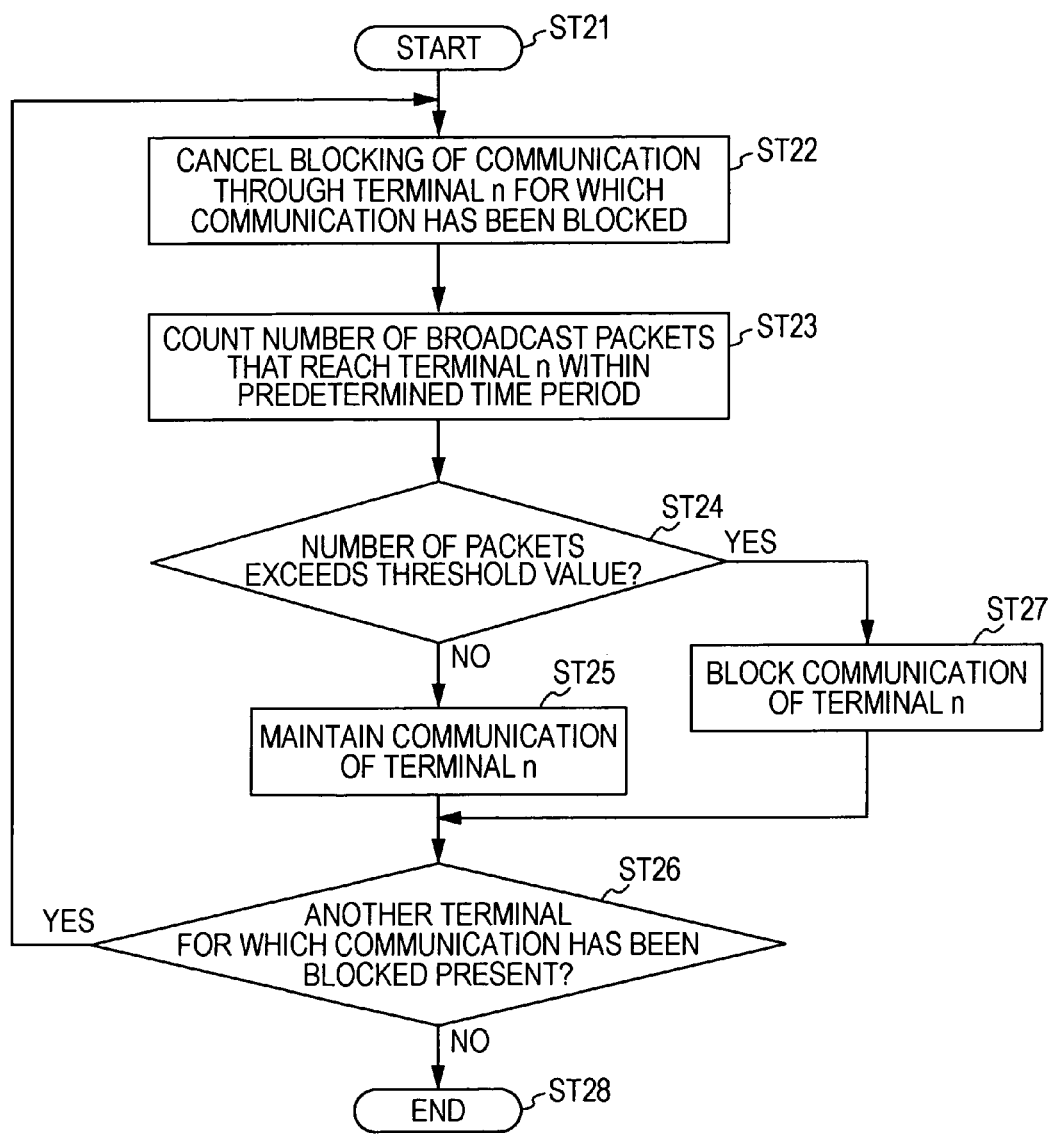
FIG. 16 is a flowchart of an example of a communication recovery process performed by the control unit of the television receiver.

FIG. 16 is a flowchart of a communication recovery process performed by the control unit 136 for a predetermined network terminal for which blocking of communication is set. For example, after communication is blocked, the control unit 136 performs this communication recovery process (a) at predetermined time intervals (e.g., every one hour), (b) when the user selects and activates a recovery process from a menu provided for the apparatus, or (c) when the HDMI cable is disconnected and, subsequently, connected.

Note that the control unit 136 of the television receiver 130 can detect whether the HDMI cable is disconnected and, subsequently, connected using a change in the voltage level of the HPD signal. For example, when the voltage level of the HPD signal is changed from low (L) to high (H), it can be determined that an HDMI cable is connected. In contrast, when the voltage level of the HPD signal is changed from high (H) to low (L), it can be determined that an HDMI cable is disconnected.

In step ST21, the control unit 136 starts the communication recovery process. In this case, the control unit 136 sets the modes of the traffic managers 202b to 202f corresponding to the ports 132b to 132f (Ports 1 to 5) to modes in which a broadcast packet is preferentially output. In addition, the control unit 136 inputs a broadcast packet from the communication unit 135 to the port 132a of the switching hub 133 at a constant frequency.

Subsequently, in step ST22, the control unit 136 cancels blocking of communication for a network terminal n for which communication has been blocked. Thereafter, in step ST23, the control unit 136 reaches the network terminal n. That is, the control unit 136 counts the number of broadcast packets input to the port of the switching hub 133 connected to the network terminal n. In this case, the control unit 136 performs the counting operation using the control register 204 of the switching hub 133.

Subsequently, in step ST24, the control unit 136 determines whether the number of packets counted in step ST23 is greater than the threshold value TH (refer to FIG. 10). If the number of packets is not greater than the threshold value TH, the control unit 136, in step ST25, determines that the network terminal n is not a terminal that forms a loop connection state. Accordingly, the control unit 136 maintains communication of the network terminal n, that is, the control unit 136 maintains cancellation of blocking of communication of the network terminal. Thereafter, the processing proceeds to step ST26.

However, the number of packets is greater than the threshold value TH, the control unit 136, in step ST27, determines that the network terminal n is still a terminal that forms a loop connection state. Accordingly, the control unit 136 blocks communication of the network terminal n again. Thereafter, the processing proceeds to step ST26.

In step ST26, the control unit 136 determines whether another network terminal for which communication has been blocked is present. If another network terminal for which communication has been blocked is present, the processing returns to step ST22, where the control unit 136 starts processing for the next network terminal. However, if another network terminal is not present, the processing returns to step ST27, where the control unit 136 completes the communication recovery process. As described above, the mode in which a broadcast packet is preferentially output from each of the ports 132b to 132f of the switching hub 133 and the mode in which a broadcast packet is input from the communication unit 135 to the port 132a of the switching hub 133 at a constant frequency activated in step ST21 as described above are deactivated.

When the communication recovery process illustrated in FIG. 16 is performed and if a network terminal for which communication is blocked when power is turned on does not form a loop connection state due to later cable disconnection or connection change, the network terminal can be automatically returned to a communication enable mode.

Note that, in the communication recovery process illustrated in FIG. 16, blocking of communication is canceled for each of the network terminals one by one, and it is determined whether a terminal that forms a loop connection state is present. However, blocking of communication for all of the network terminals for which communication has been blocked may be canceled, and whether each of the terminals is a terminal that forms a loop connection state may be determined in a manner similar to the loop detection processing illustrated above in FIG. 15.

As described above, in the television receiver 130 of the AV system 100 shown in FIG. 1, the number of broadcast packets reaching the network terminals 131a to 131e within a predetermined time period is counted, and each of the count values is compared with threshold value. In this way, a terminal that forms a loop connection state, that is, an abnormally connected terminal is detected. Accordingly, an abnormally connected terminal can be easily detected with a simplified configuration.

In addition, in the television receiver 130 of the AV system 100 shown in FIG. 1, when a loop connection state occurs, that is, when a loop is formed, a message indicating that information and a network terminal that form the loop connection state are displayed on the display panel 138. Accordingly, a user can change the connection and easily remove the abnormal connection state.

Furthermore, in the television receiver 130 of the AV system 100 shown in FIG. 1, when a loop connection state occurs, that is, when a loop is formed, a message prompting a user to select blocking of communication of the abnormally connected terminal is displayed on the display panel 138, and communication through the abnormally connected terminal for which the user selects blocking of communication is automatically blocked. Accordingly, a troublesome user operation, such as disconnecting a cable from the abnormally connected terminal, can be eliminated. In addition, blocking of communication that the user does not desire can be prevented.

Still furthermore, in the television receiver 130 of the AV system 100 shown in FIG. 1, when the control unit 136 performs loop detection processing, the packet output unit 235 corresponding to the port 132a (Port 0) of the switching hub 133 enters a mode in which a broadcast packet is preferentially output. Accordingly, the sensitivity of detection of a loop connection state (loop detection) can be increased.

Yet still furthermore, in the television receiver 130 of the AV system 100 shown in FIG. 1, when the control unit 136 performs loop detection processing, the bandwidth limiting unit 236 corresponding to the port 132a (Port 0) of the switching hub 133 enters a mode in which a transmission bandwidth is limited to a predetermined bandwidth. Accordingly, the number of broadcast packets transmitted to the communication unit 135 is limited. Consequently, the loop detection processing is not affected by the overload of the control unit (the CPU) 136.

Yet still furthermore, in the television receiver 130 of the AV system 100 shown in FIG. 1, when the control unit 136 performs loop detection processing, the packet output unit 235 of each of the ports of the switching hub 133 enters a mode in which a broadcast packet is preferentially output. Accordingly, if a loop connection state occurs, a broadcast packet preferentially flows in the loop. Therefore, the sensitivity of loop detection and the sensitivity of detection of a network terminal that forms the loop connection state can be increased.

While the foregoing embodiment has been described with reference to the loop detection processing performed by the control unit 136 of the television receiver 130 when power is turned on (refer to FIGS. 12 and 15), the loop detection processing may be performed at another time point. For example, the loop detection processing may be performed in response to a user instruction of loop detection processing. Alternatively, for example, when an HDMI cable is disconnected and, subsequently, connected, the loop detection processing may be performed. Still alternatively, the loop detection processing may be performed at every moment. In this case, the control unit 136 performs the loop detection processing at a constant frequency even after power is turned on.

In addition, while the foregoing embodiment has been described with reference to loop detection processing performed by the television receiver 130 serving as a sink device, the loop detection processing may be performed by the set-top box 150, the personal computer 160, or the BD recorder 180 serving as a source device. Alternatively, the amplifier 170 serving as a repeater device may perform loop detection processing in a similar manner. Note that, in such a case, a display signal may be sent to the television receiver 130 so that a message indicating, for example, abnormal connection is displayed on the display panel 138 of the television receiver 130.

Furthermore, while the foregoing embodiment has been described with reference to the case in which the apparatuses are connected to one another using an Ethernet cable and an HDMI cable, the transmission paths that connect the apparatuses with one another is not limited to wired paths. The transmission paths may be wireless transmission paths.

INDUSTRIAL APPLICABILITY

According to the present invention, a terminal that forms a loop connection state can be easily detected with a simplified configuration. The present invention is applicable to an AV system in which a plurality of AV apparatuses are connected with one another using a network.

The invention claimed is:

1. An electronic apparatus characterized by comprising:
    a plurality of terminals to which transmission paths that transmit data packets are connected;
    a switching hub to which the plurality of terminals are connected;
    a communication unit for transmitting and receiving the data packets via the switching hub;
    a packet counting unit for counting the number of broadcast packets reaching the plurality of terminals within a predetermined time period; and
    a loop detection unit for determining the terminal that forms a loop connection state by comparing a count value for each of the plurality of terminals counted by the packet counting unit with a threshold value,
    the switching hub outputs a broadcast packet to the communication unit when one or more broadcast packets are stored in the switching hub, and the switching hub outputs a non-broadcast packet to the communication unit only when no broadcast packet is stored in the switching hub.

2. The electronic apparatus according to claim 1, characterized by further comprising:
    an information display unit for displaying a message indicating the occurrence of abnormal connection and the terminal that forms the loop connection state on the basis of the determination result of the loop detection unit.

3. The electronic apparatus according to claim 2, characterized in that the information display unit further displays a message prompting a connection change.

4. The electronic apparatus according to claim 1, characterized by further comprising:
    a communication blocking control unit for blocking communication performed through the terminal that forms the loop connection state.

5. The electronic apparatus according to claim 4, characterized in that, when the packet counting unit counts the number of the broadcast packets transmitted within the predetermined time period, the communication blocking control unit cancels blocking of communication previously activated.

6. The electronic apparatus according to claim 4, characterized by further comprising:
    a user selection unit for allowing a user to select whether communication through the terminal that forms the loop transmission path is blocked;
    wherein the communication blocking control unit blocks the communication through the terminal that forms the loop connection state when the user selects blocking of the communication.

7. The electronic apparatus according to claim 1, characterized in that, when the packet counting unit counts the number of broadcast packets transmitted within the predetermined time period, the communication unit transmits the broadband packet to the transmission paths to which the plurality of terminals are connected via the switching hub.

8. The electronic apparatus according to claim 1, characterized in that the switching hub limits a transmission bandwidth for the communication unit to a predetermined bandwidth.

9. The electronic apparatus according to claim 1, characterized in that at least some of the transmission paths connected to the plurality of terminals are bidirectional transmission paths formed from predetermined lines of an HDMI cable.

10. The electronic apparatus according to claim 8, characterized in that the predetermined lines are a reserve line and HPD line.

11. A loop detection method for use in an electronic apparatus including a plurality of terminals to which transmission paths that transmit data packets are connected, a switching hub to which the plurality of terminals are connected, and a communication unit for transmitting and receiving the data packets via the switching hub, characterized by comprising:

a packet counting step of counting the number of broadcast packets reaching the plurality of terminals within a predetermined time period; and a loop detection step of determining the terminal that forms a loop connection state by comparing a count value for each of the plurality of terminals counted in the packet counting step with a threshold value, the switching hub outputs a broadcast packet to the communication unit when one or more broadcast packets are stored in the switching hub, and the switching hub outputs a non-broadcast packet to the communication unit only when no broadcast packet is stored in the switching hub.

* * * * *